United States Patent
Breslow

(10) Patent No.: US 10,884,948 B2
(45) Date of Patent: Jan. 5, 2021

(54) REPLACING POINTERS WITH HASHING IN TREE-BASED PAGE TABLE DESIGNS

(71) Applicant: Advanced Micro Devices, Inc., Santa Clara, CA (US)

(72) Inventor: Alexander D. Breslow, Santa Clara, CA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 16/414,739

(22) Filed: May 16, 2019

(65) Prior Publication Data

US 2020/0364150 A1 Nov. 19, 2020

(51) Int. Cl.
*G06F 12/1018* (2016.01)
*G06F 12/1036* (2016.01)
*G06F 12/1072* (2016.01)
*G06F 16/901* (2019.01)

(52) U.S. Cl.
CPC ...... *G06F 12/1018* (2013.01); *G06F 12/1036* (2013.01); *G06F 12/1072* (2013.01); *G06F 16/9027* (2019.01)

(58) Field of Classification Search
CPC .. G06F 12/1018; G06F 12/1009; G06F 12/10; G06F 12/1072; G06F 12/1036; G06F 12/109; G06F 16/9035; G06F 16/9027; H04L 9/0643; H04L 9/0894
See application file for complete search history.

(56) References Cited

U.S. PATENT DOCUMENTS 5,463,739 A * 10/1995 Albaugh ............... G06F 12/08
710/116
2004/0078631 A1 * 4/2004 Rogers .................. G06F 12/08
714/5.11
2006/0069899 A1 * 3/2006 Schoinas ............... G06F 12/109
711/206
2006/0190243 A1 * 8/2006 Barkai ................. G06F 16/278
704/8
2008/0097971 A1 * 4/2008 Chen ................... G06F 16/2255
2017/0242790 A1 * 8/2017 O'Krafka ............ G06F 12/0246

OTHER PUBLICATIONS

Barr, et al. "Translation Caching: Skip, Don't Walk (the Page Table)," ISCA, Jun. 2010 (Year: 2010).*
Elphinstone et al. "Issues in Implementing Virtual Memory," University of NSW 2052 Australia, Sep. 24, 1994 (Year: 1994).*
Yaniv, et al. "Hash, Don't Cache (the Page Table)," SIGMETRICS '16, Jun. 2019 (Year: 2016).*
Du, Yu, et al. "Supporting superpages in non-contiguous physical memory." 2015 IEEE 21st International Symposium on High Performance Computer Architecture (HPCA). IEEE, 2015.

* cited by examiner

*Primary Examiner* — Michael Krofcheck

(74) *Attorney, Agent, or Firm* — Liang & Cheng, PC

(57) ABSTRACT

A device includes an address translation table to, in each node of a set of nodes in the address translation table, store a key value and a hash function identifier, a hash engine coupled with the address translation table to, for each node in the set of nodes, calculate a hash result for the key value by executing a hash function identified by the hash function identifier, and a processing unit coupled with the hash engine to, in response to a request to translate a virtual memory address to a physical memory address, identify a physical memory region corresponding to the virtual memory address based on the calculated hash result for each node in the set of nodes.

20 Claims, 13 Drawing Sheets

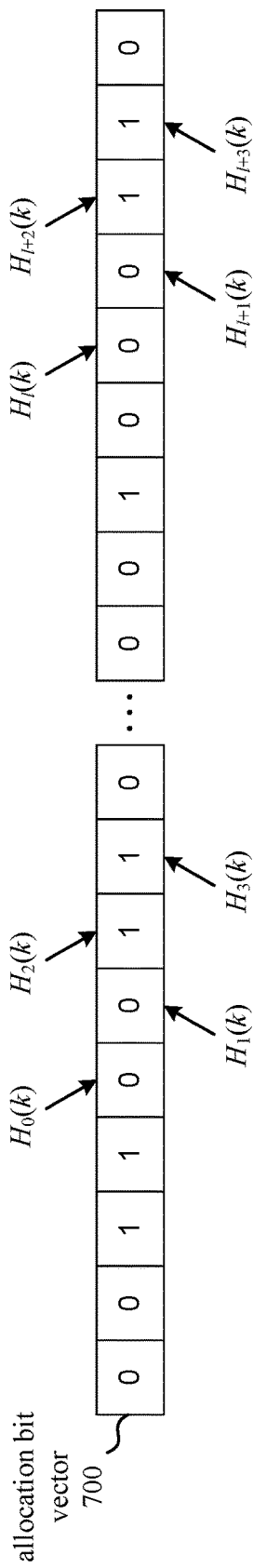
FIGURE 7A
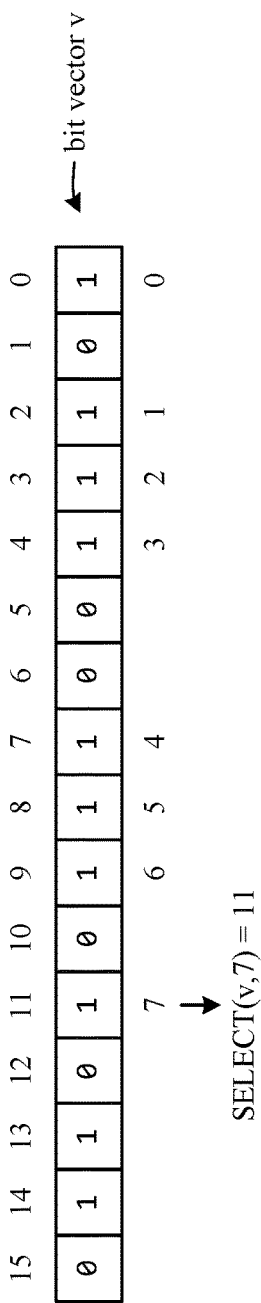
FIGURE 7B
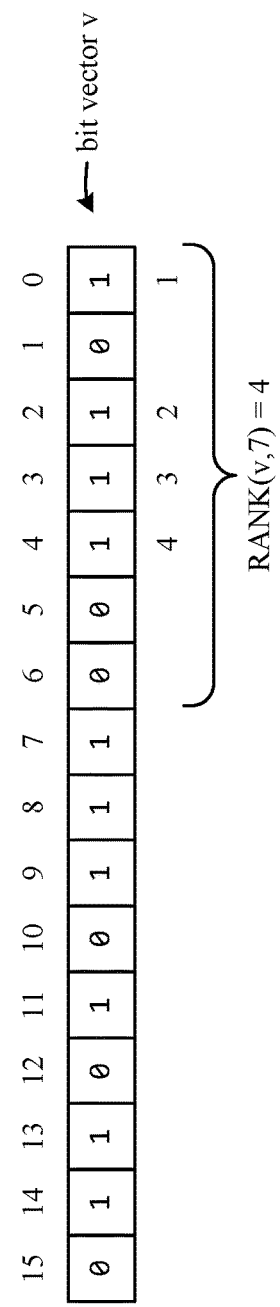

REPLACING POINTERS WITH HASHING IN TREE-BASED PAGE TABLE DESIGNS

BACKGROUND

Memory virtualization is a technique employed in modern computing systems that allows software processes to view non-contiguous physical memory regions as a single contiguous region. A software process or task executing in the computer accesses memory using virtual memory addresses; these are mapped to physical memory addresses, and the translation between virtual and physical memory addresses is handled by hardware and software in the computer. The operating system in the computer handles the assignment of physical memory to virtual memory, and translations between virtual and physical memory addresses are performed automatically by a memory management unit (MMU).

Virtualization of memory allows processes to be run in their own dedicated virtual address spaces, obviating the need to relocate program code or to access memory with relative addressing, and also increasing security due to memory isolation. In addition, systems using virtual memory addressing methods delegate to the kernel the burden of managing the memory hierarchy, and make application programming easier by hiding fragmentation of physical memory.

BRIEF DESCRIPTION OF THE DRAWINGS

The present disclosure is illustrated by way of example, and not by way of limitation, in the figures of the accompanying drawings.

FIG. 7A illustrates an allocation bit vector, according to an embodiment.

FIG. 7B illustrates the SELECT and RANK operations, according to an embodiment.

DETAILED DESCRIPTION

The following description sets forth numerous specific details such as examples of specific systems, components, methods, and so forth, in order to provide a good understanding of the embodiments. It will be apparent to one skilled in the art, however, that at least some embodiments may be practiced without these specific details. In other instances, well-known components or methods are not described in detail or are presented in a simple block diagram format in order to avoid unnecessarily obscuring the embodiments. Thus, the specific details set forth are merely exemplary. Particular implementations may vary from these exemplary details and still be contemplated to be within the scope of the embodiments.

Virtual memory addressing in a computing system can consume a significant share of the available resources in the system, particularly when running applications with extremely large memory footprints. For example, such applications tend to increase pressure on the system's cache, with the amount of memory capacity consumed being directly affected by the length of the cached address translation entries. Accordingly, a reduction in the number of bits used for addressing in each address translation entry corresponds to an increase in the number of bits available for other uses, such as a greater number of AVAILABLE bits in each entry that can be used by the operating system in the computing system.

In one embodiment, a hierarchical page table is traversed by using a hashing mechanism to compute an address for locating an entry in each node that is traversed, thus reducing the size of each entry (e.g., page directory entries and page table entries) in the page table as compared to storing an explicit address. Application performance is improved (e.g., lower latency and memory consumption) due to lowering the performance overhead for implementing virtual addressing.

In one embodiment, the size of the addressable physical memory is increased due to an increased per-node fanout in the page table. As an example, a reduced hashed address representation increases the per-node fanout of a radix-tree based page table by a factor of 2 by reducing the size of page directory and table entries from 64 bits in x86-64 bit long mode addressing to 32 bits. Accordingly, the maximum physical address space is increased by a factor of 16, from 52 bits to 56 bits. Twice as many page table entries can be copied per transfer from dynamic random access memory (DRAM) since they are half as long (32 bits versus 64 bits), and the reach of the level 2 (L2) translation lookaside buffers (TLBs) is doubled for the same TLB size (i.e., the TLB can cache twice as many address translations) in certain implementations. In one embodiment, the hashed address representation is compatible with copy-on-write and interprocess shared memory mechanisms.

Figure 1:
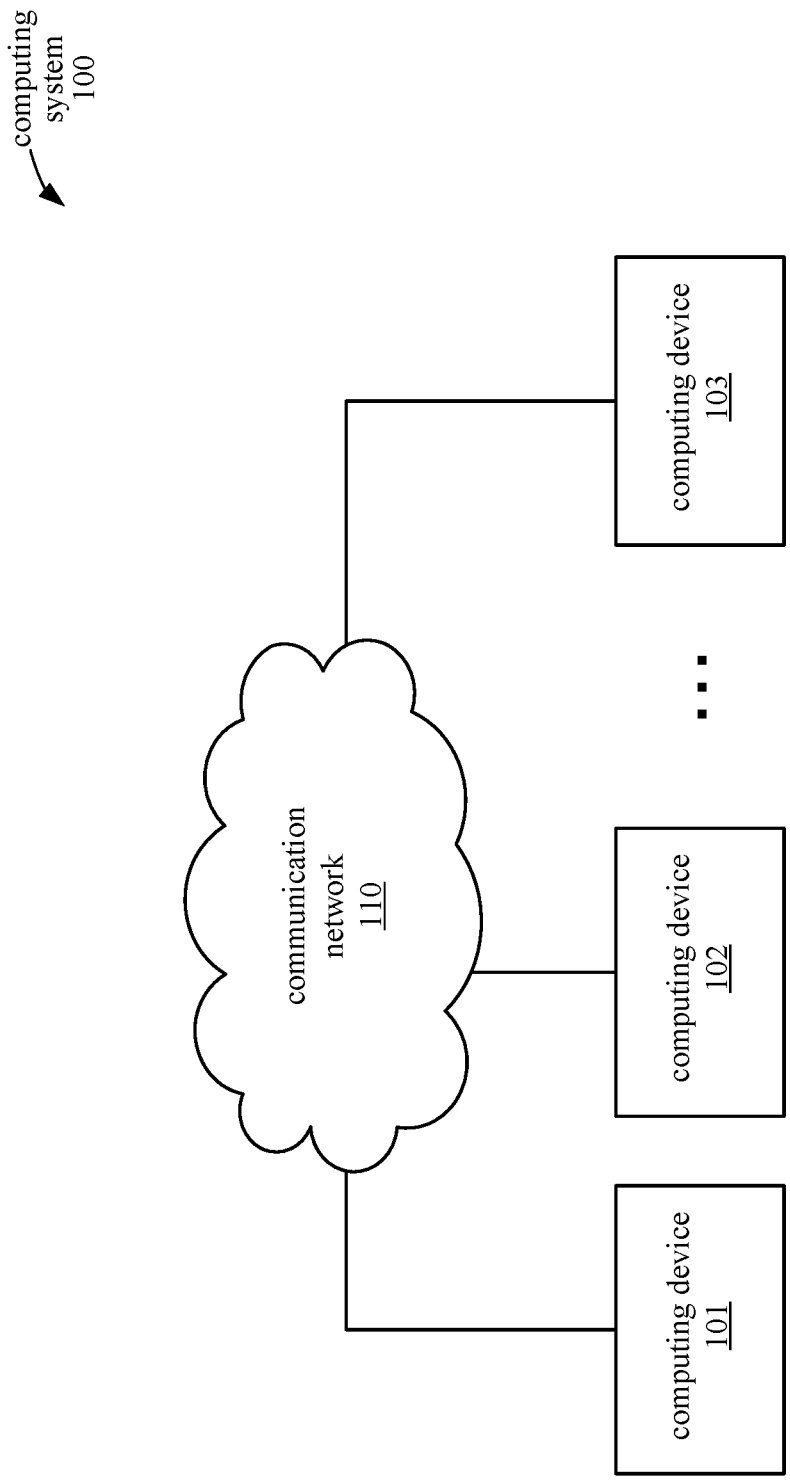
FIG. 1 illustrates a computing system, according to an embodiment.

FIG. 1 illustrates an embodiment of a distributed computing system 100 in which page tables with hashed address representations are implemented. Computing system 100 includes multiple computing devices 101-103 (e.g., servers, mobile devices, etc.) that are connected to each other via a communication network 110. Each of the computing devices 101-103 has processing and memory storage capabilities. In one embodiment, the computing system 100 is contained within a single physical enclosure, and the communication network 110 is a bus or system interconnect connecting the computing devices 101-103 within the enclosure. For example, the computing devices 101-103 can include processing units such as graphics processing units (GPUs), central processing units (CPUs), field programmable gate arrays (FPGAs), etc. on the same board or on separate carrier boards that are connected to each other via a backplane. In one embodiment, the components in the computing system 100 are contained in separate physical enclosures and are geographically distributed. For example, the computing devices 101-103 can represent individual servers, personal computers, mobile devices, etc. that are connected to each other via a wide-area network (WAN) such as the Internet, a local-area network (LAN), wireless network, or other communication network 110. In one embodiment, the computing devices 101-103 represent the same type or similar types of devices; alternatively, the computing devices 101-103 are different types of devices.

In one embodiment, the computing system 100 is a datacenter in which physical memory locations of memory devices distributed across the computing devices 101-103 are addressable using a single virtual memory address space. In such an embodiment, a processing unit in one of the computing devices 101-103 accesses its own physical memory and physical memory in any of the other computing devices 101-103 using the same virtual memory address space. In one embodiment, a page table address hashing mechanism allows mapping of virtual addresses in the single virtual memory space to be mapped to physical memory addresses across multiple computing devices 101-103 in the system 100.

Figure 2:
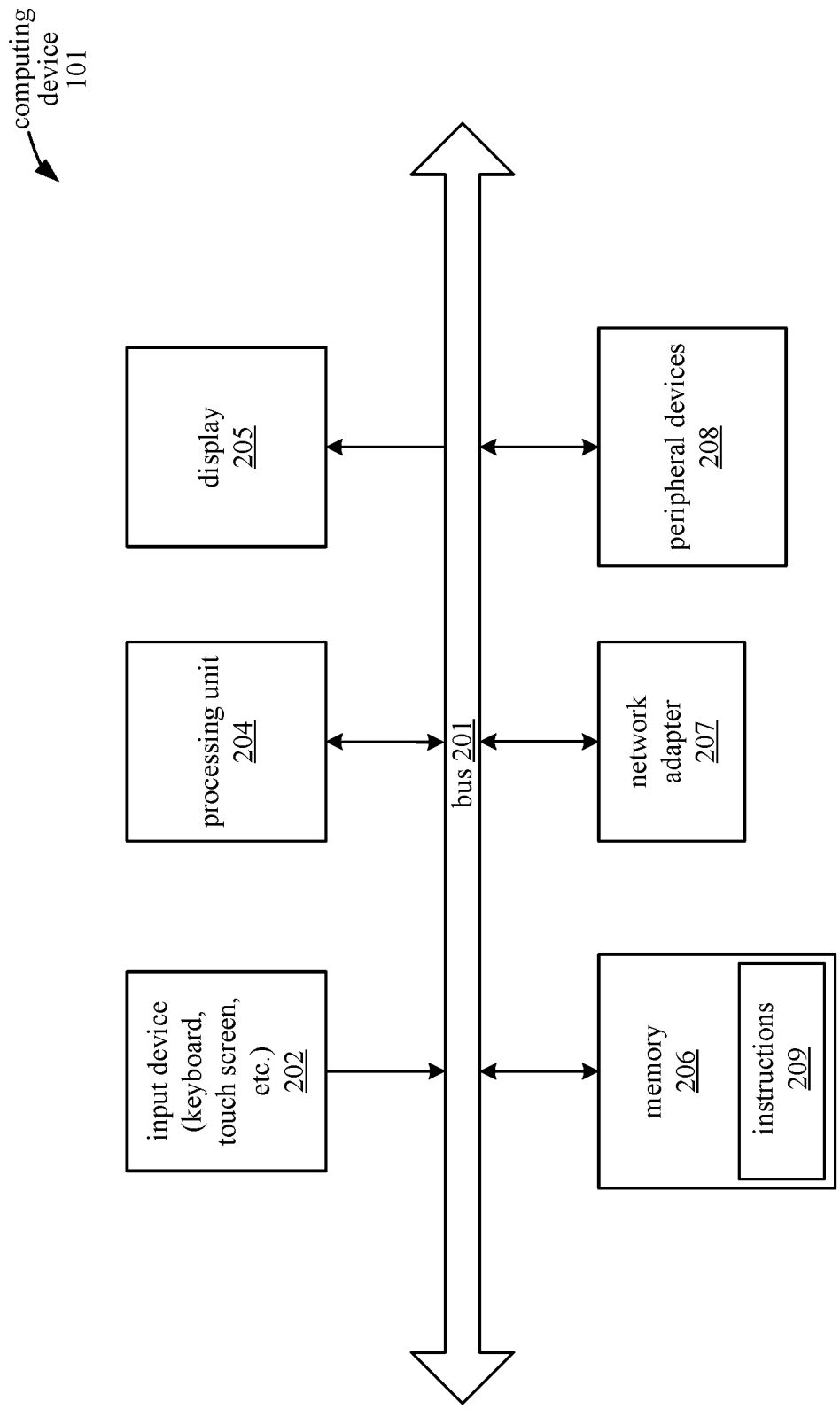
FIG. 2 illustrates a computing device, according to an embodiment.

FIG. 2 illustrates an embodiment of a computing device 101 that implements page tables with hashed address representations. In general, the computing device 101 may be embodied as any of a number of different types of devices, including but not limited to a laptop or desktop computer, mobile phone, server, etc. The computing device 101 includes a number of components 202-208 that can communicate with each other through a bus 201. In computing device 101, each of the components 202-208 is capable of communicating with any of the other components 202-208 either directly through the bus 201, or via one or more of the other components 202-208. The components 202-208 in computing device 101 are contained within a single physical casing, such as a laptop or desktop chassis, or a mobile phone casing. In alternative embodiments, some of the components of computing device 101 may be embodied as peripheral devices such that the entire computing device 101 does not reside within a single physical casing.

The computing device 101 also includes user interface devices for receiving information from or providing information to a user. Specifically, the computing device 101 includes an input device 202, such as a keyboard, mouse, touch-screen, or other device for receiving information from the user. The computing device 101 displays information to the user via a display 205, such as a monitor, light-emitting diode (LED) display, liquid crystal display, or other output device.

Computing device 101 additionally may include a network adapter 207 for transmitting and receiving data over a wired or wireless network. Computing device 101 also includes one or more peripheral devices 208. The peripheral devices 208 may include mass storage devices, location detection devices, sensors, input devices, or other types of devices that can be used by the computing system 200.

Computing device 101 includes a processing unit 204 that receives and executes instructions 209 that are stored in the main memory 206. As referenced herein, processing unit 204 represents a central processing unit (CPU) pipelines, graphics processing unit (GPU), or other computing engine that supports memory operations that use virtual addresses. Main memory 206 may be part of a memory subsystem of the computing device 101 that includes memory devices used by the computing device 101, such as random-access memory (RAM) modules, read-only memory (ROM) modules, hard disks, and other non-transitory computer-readable media.

In addition to the main memory 206, the memory subsystem includes cache memories, such as L2 or L3 caches, and registers. Such cache memory and registers may be present in the processing unit 204 or on other components of the computing device 101.

Figure 3:
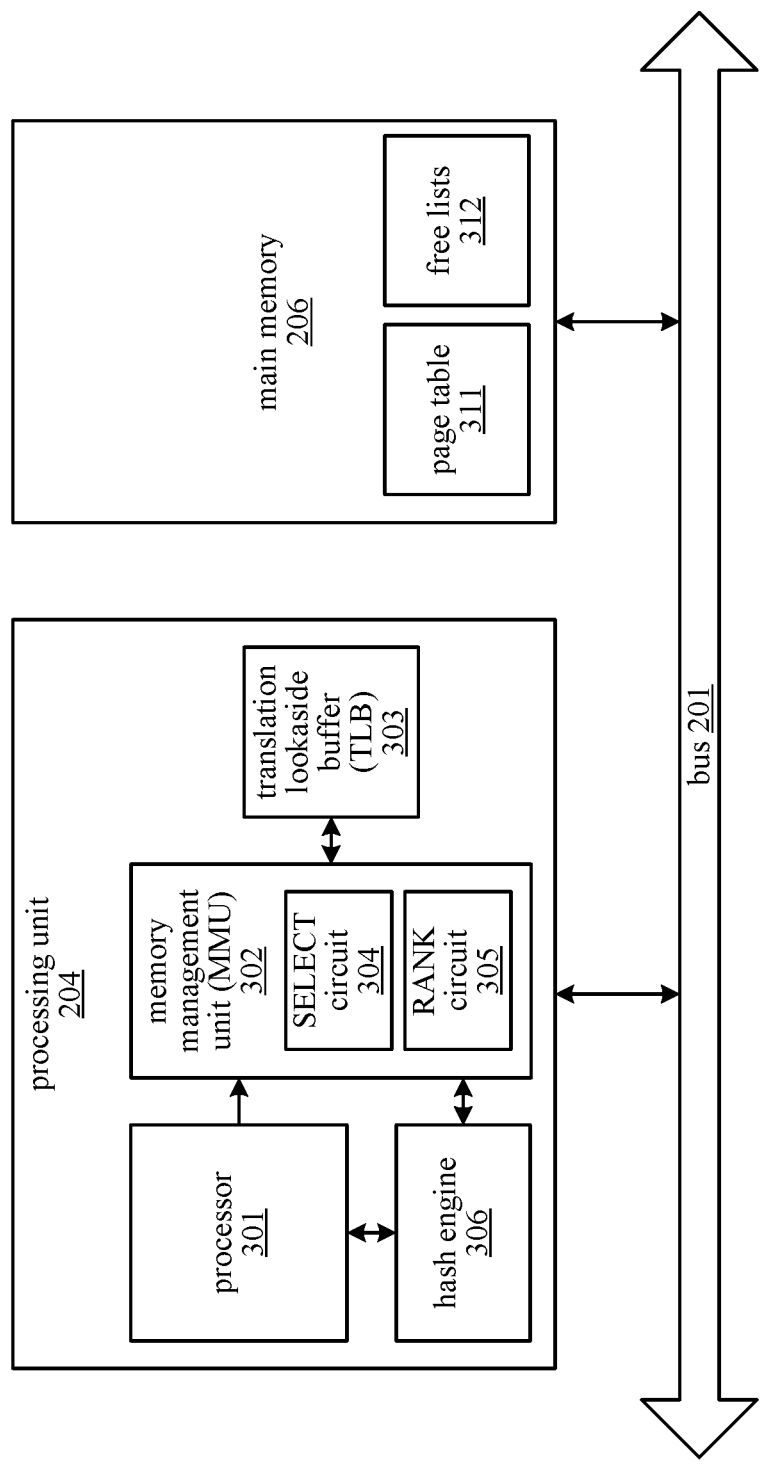
FIG. 3 illustrates components in a processing unit and a main memory in a computing device, according to an embodiment.

FIG. 3 illustrates the processing unit 204 and main memory 206 of the computing device 101, according to an embodiment. The processing unit 204 includes a processor 301 (e.g., a CPU, GPU, etc.), a memory management unit (MMU) 302, a translation lookaside buffer (TLB) 303, and a hash engine 306. In one embodiment, the components 301-306 of the processing unit 204 are contained within the same device package. During execution of program instructions 209, the processor 301 accesses data stored in the main memory 206 by issuing memory requests via one or more memory controllers. The processor 301 references memory locations using virtual addresses, which are translated to physical memory addresses by the MMU 302. The MMU 302 performs the translations using entries in the page table 311, which stores the virtual address to physical address translations. The translations are additionally cached in the TLB. In one embodiment, the MMU 302 also includes SELECT 304 and RANK circuitry 305, which are used for decoding allocation bit vectors, which identify physical pages that are free for allocation.

The page table 311 is stored in the main memory 206 and stores address translation information in a tree, hash table, or associative map data structure. The processing unit 204, upon accessing a virtual address, performs a virtual-to-physical address translation by checking the TLB 303 for the translation and, if the translation is not available in the TLB 303 (i.e., a TLB miss occurs), then the MMU 302 performs a page table walk. During the page table walk, the MMU 302 traverses the nodes in the page table 311 based on the virtual address to be translated. In the page table 311, interior nodes are nodes that contain entries each pointing to a child node in the page table 311. Leaf nodes in the page table 311 contain entries that point to physical pages of application data in the physical memory. What constitutes a leaf node changes with the page size (e.g., L3, L2, or L1 in x86_64 long mode with 1 GB, 2 MB, and 4 KB pages, respectively) as more of the virtual address is page offset with larger pages.

The memory 206 also stores a set of free lists 312. Free lists 312 are maintained by the operating system of the computing device 101 and are used to keep track of memory pages that are available for allocating to new data. As memory is deallocated (i.e., freed), the deallocated pages are added to one of the free lists 312. When memory is allocated, free memory pages for allocating the new data are identified from the free lists 312.

Figure 4:
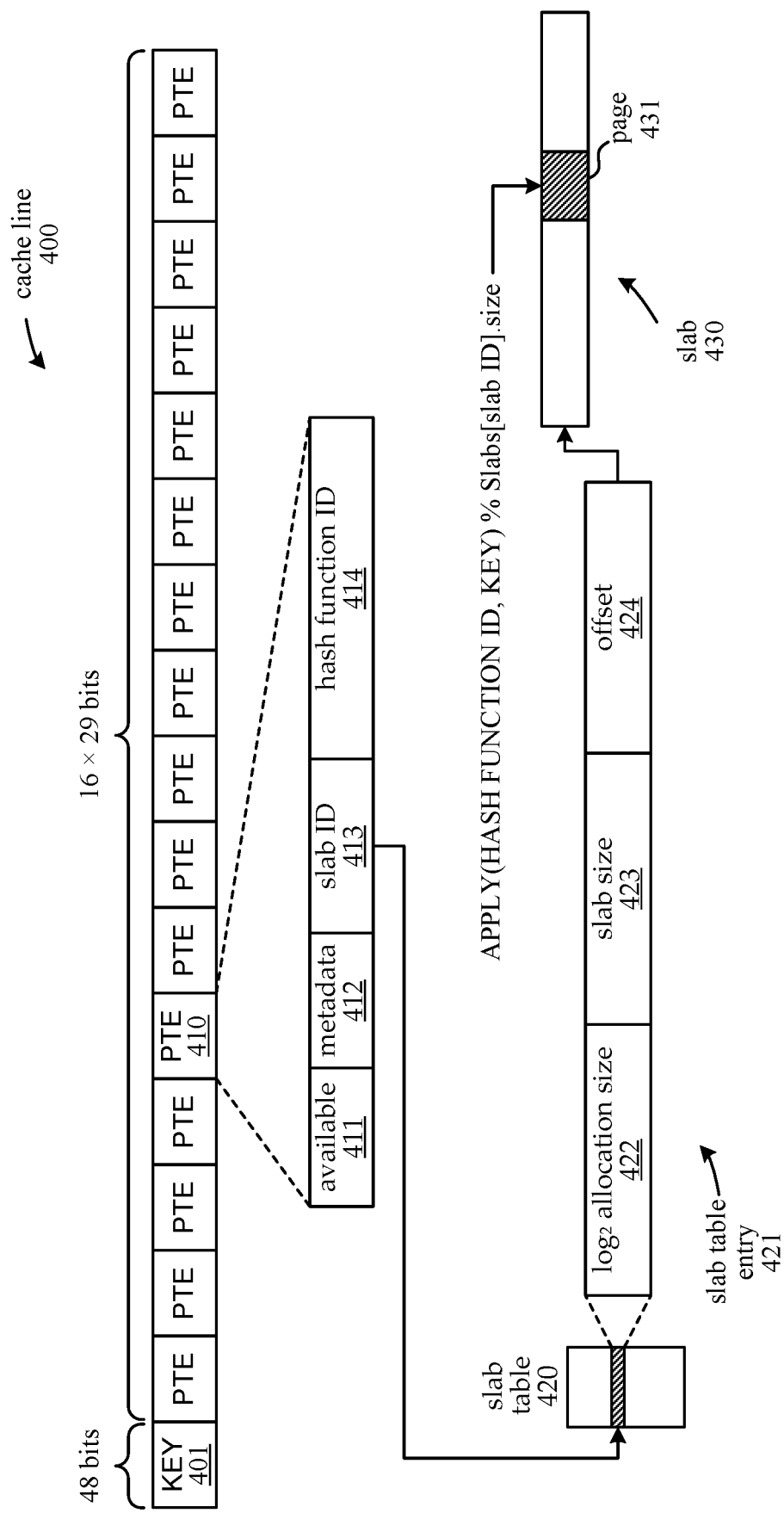
FIG. 4 illustrates cache line from a page table node, according to an embodiment.

FIG. 4 illustrates a cache line 400 of data from a node of the page table 311, according to an embodiment. The cache line 400 includes a key value 401 that is associated with multiple page table entries (PTEs). In the illustrated example, the cache line 400 is a 512-bit cache line and includes 16×29-bit page table entries, including entry 410. The remaining 48 bits include the key 401 and reserved bits (not shown). Each of the page table entries in the cache line 400 associates a hash function identifier and a slab identifier with the key 401. For example, the exemplary page table entry 410 records a set of AVAILABLE bits 411, metadata 412, a slab identifier 413, and a hash function identifier 414.

In the page table entry 410, the AVAILABLE bits 411 are bits that are available for the operating system to manipulate. The METADATA fields 412 are fields used for page protection and other purposes. These fields need not be contiguous (e.g., AVAILABLE is split into two groups with long mode addressing in x86-64 architectures). The page table entry 410 represents the address of a child node using the slab identifier field 413 and the hash function identifier 414. In some cases, the child node can be a page of application data.

The slab identifier field 413 identifies a physical memory region called a memory slab 430, in which the child node is allocated. The slab identifier 413 is used to address into a slab table 420 that stores metadata associated with the identified slab 430. Each entry in the slab table 420 associates a slab with a log base 2 allocation size 422 (the power to which 2 is raised to obtain the allocation size of an item in the slab), a slab size 423 (the size of the slab as a multiple of the item size), and an offset (i.e., a base address of the slab).

Since different processes have their own address spaces, one embodiment maintains a slab table for each process, allowing different processes to share the same region of memory but to potentially use different slab identifiers. In some embodiments, a hardware slab table is implemented. To avoid flushing of a hardware slab table on context switches, address space identifiers or process identifiers are associated with each entry. When a fork or clone of a process takes place, the slab table is partially or fully replicated along with the page table and other state of the process. When a process is running low on memory or allocation of a page fails, a new slab is allocated and assigned an unassigned slab identifier.

In alternative embodiments, the slab identifier 413 is replaced with an identifier for a memory region other than a slab such as, for example, an array of physical pages of memory. Metadata for other types of memory regions can be stored in a region table similar to the slab table 420.

The metadata provided in the slab table 420 for the identified slab 430 is used in conjunction with the hash function identifier 414 to calculate the address of the referenced child node in the identified slab 430. The hash function identifier 414 identifies a hash function that is computed on a key (e.g., the key 401) to produce an index for the identified slab 430 that corresponds to the location of the child node in the slab 430. If copy-on-write and inter-process shared memory are not needed, then in some embodiments, the key 401 can be a subset of the physical address of the page directory or table entry of interest, or of its relative position within the slab or other region in which it is allocated.

To get the full address of the node on a byte-addressable computer, the offset 424 (i.e., base address) of the slab 430 is added to the scaled offset of the page within the slab (index×page size in bytes). These computations are expressed in Equations 1 and 2 below:

$$\text{SLAB\_INDEX} = \text{APPLY}(\text{HASH\_FUNCTION\_ID}, \text{KEY}) \% \text{Slabs}[\text{slab ID}].\text{size} \quad \text{(Equation 1)}$$

$$\text{PHYSICAL\_ADDRESS\_OF\_CHILD} = \text{Slabs}[\text{slab ID}].\text{offset} + \text{SLAB\_INDEX} \ll \text{LOG2\_SLAB\_ALLOCATION\_SIZE\_IN\_BYTES} + \text{PAGE\_OFFSET} \quad \text{(Equation 2)}$$

In Equation 1, the index SLAB_INDEX of the page 431 within the slab 430 is computed by the APPLY( ) function, which executes a hash function on the KEY 401, where the hash function is identified by the HASH_FUNCTION_ID 414. In case the output of the APPLY( ) function is too many bits in length, a modulo operation or analogous reduction (e.g., fast range) is performed on the hash result with the slab size 423 as the divisor. 'Slabs[slab ID]' represents the entry 421 indexed by the slab ID 413 in the slab table 420, and Slabs[slab ID].size represents the slab size 423 of the entry 421. In Equation 2, the physical address (i.e., 'PHYSICAL_ADDRESS_OF_CHILD') of the child node within the identified slab is calculated by adding the offset 424 (i.e., 'Slabs[slab ID].offset') of the slab 430 to the SLAB_INDEX calculated from Equation 1 left-shifted by the LOG2_SLAB_ALLOCATION_SIZE_IN_BYTES 422. Finally, the PAGE_OFFSET from the virtual address is added to the result to obtain the final physical address within the page 431.

In the example above, the size of each entry in the page table is reduced to 32 bits (including 29 bits for each entry and three bits of amortized cost for the key field 401). In one embodiment, 10 of those bits are reserved for the metadata 412, leaving 19 bits for the slab identifier 413 and hash function identifier 414. Accordingly $2^{19}$, or 524,288 physical pages can be addressed for allocating the virtual page's backing physical page, assuming no bits in the entry are reserved for the AVAILABLE bits 411.

In some embodiments, a subset or the full set of the AVAILABLE bits 411 are stored in a separate table that mirrors the structure of the page table 311. Since the AVAILABLE bits 411 are used by the operating system and not used by the MMU 302 or TLB 303, the AVAILABLE bits 411 are removed to another structure so they do not reduce the fanout of the page table node.

The remaining 19 bits are apportioned between the hash function identifier field 414 and the slab identifier field 413. A division of 12 bits for the hash function identifier 414 and 7 bits for the slab identifier 413 means that 4096 different hash functions can be referenced and 128 slab identifiers can be encoded. In alternative embodiments, the bits are apportioned differently between the hash function identifier 414 and slab identifier 413 fields; for example, a decrease in the number of hash functions to 1024 enables 512 different slab identifiers to be referenced. In some variants of the invention, the split between these fields is dynamically configured by encoding the size of each field in one or more control or model specific registers.

As illustrated in FIG. 4, cache line 400 includes a single key field 401; alternative embodiments include multiple key fields per cache line of entries. In some embodiments, the slab identifier 413 (or other region identifier) is shared among multiple entries within a cache line, which frees up more space for hash function IDs and/or allows more regions to be supported (e.g., a 16-bit slab or region identifier field would allow around 65 thousand different slabs or regions within a process).

In one embodiment, a base slab identifier (or region identifier) is shared among multiple entries, and each entry is also associated with a slab identifier offset. The slab identifier for an entry is obtained by adding the base slab identifier with the offset for the entry. This allows supporting a large number of slabs while increasing the flexibility of slab placement within a group of entries that share a base slab identifier.

In one embodiment, a subset of the metadata field 412 or the AVAILABLE field 411 is shared among a group of entries, which reduces their storage cost. For example, if the read/write metadata bit is the same for all entries in a cache line, then the bit is shared among the entries to reduce its storage cost from 16 bits (assuming 16 entries per cache line) to 1 bit. In some embodiments, this allows the number of page table entries per cache line to increase from 8 to 32 (assuming 4 KB long mode addressing as a baseline, with 8 B entries and 64 B cache lines) albeit with tradeoffs associated from sharing metadata. In one embodiment, metadata that is redundant in the upper levels of the page table 311 because it is also present at the leaf page table entries is removed to further increase per-node fanout at the upper levels of the page table, which helps to reduce page table height.

In one embodiment, some levels of the page table 311 use the hashing mechanism for representing addresses, while other levels use pointers (i.e., explicit addresses). In one embodiment, a process with operating system support leverages multiple page tables each having its own set of regions to increase the amount of memory that the process can address. In one embodiment, the hashing mechanism is implemented in a non-radix tree index that is used as a page table.

Figure 5:
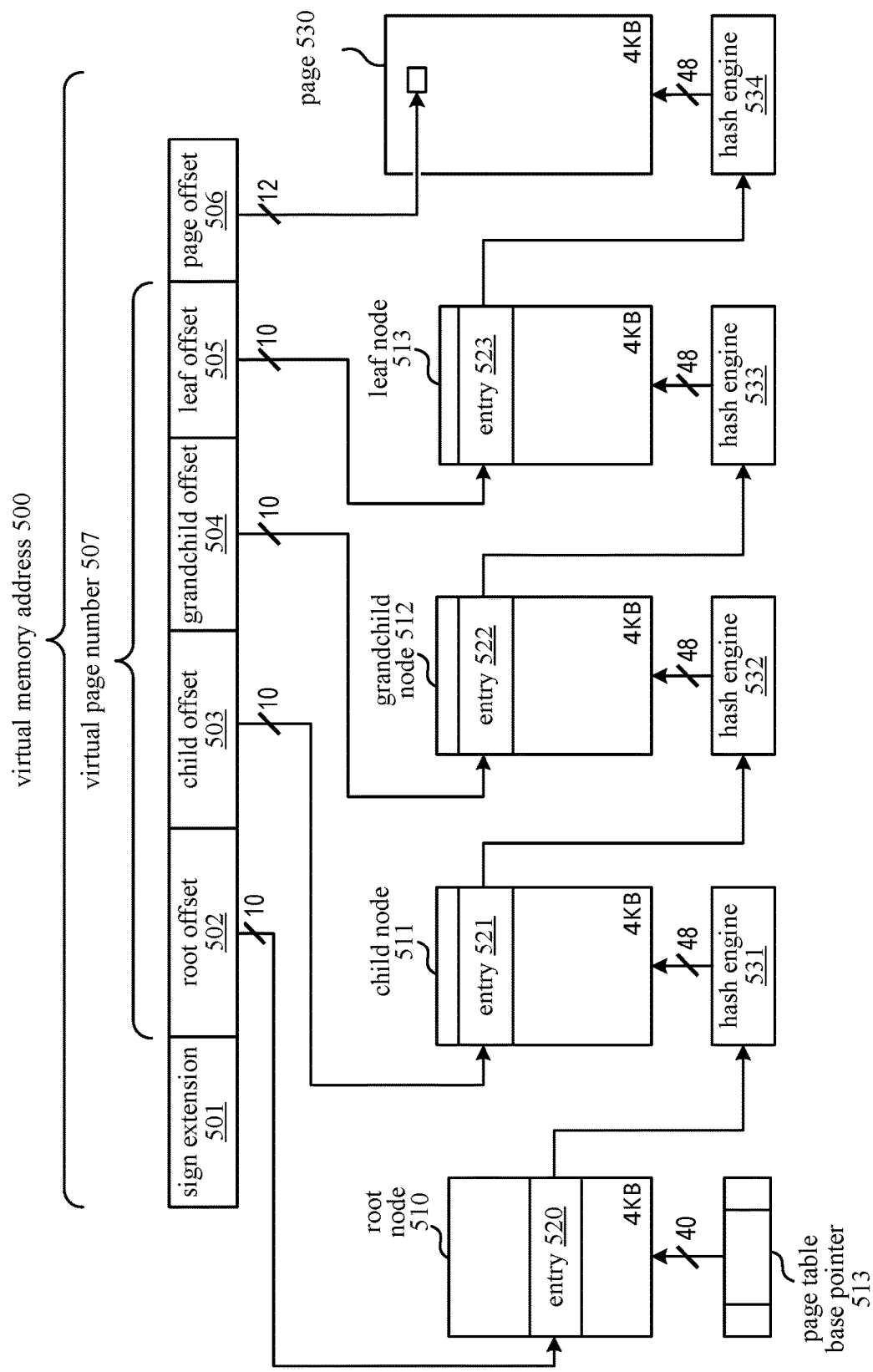
FIG. 5 illustrates a page table walk for translating a virtual address, according to an embodiment.

FIG. 5 illustrates translation of a virtual memory address into a physical memory address using the radix tree-based page table 311, according to an embodiment. The translation is performed during a page table walk by the MMU 302. The virtual memory address 500 to be translated includes a sign extension 501, a virtual page number 507 (including root offset 502, child offset 503, grandchild offset 504, and a leaf offset 505), and a page offset 506.

The MMU 302 performs a page table walk in response to an address translation request by traversing a sequence of nodes in the page table 311. For each node in the sequence, the MMU 302 identifies the next node in the sequence based on calculating a hash result calculated from an entry in the node. As shown in FIG. 5, the fields 502-505 in the virtual memory address 500 are used to traverse nodes in the page table 311, including the root node 510, child node 511, grandchild node 512, and leaf node 513. Each virtual to physical page address translation is recorded in the page table 311 by traversing a number of node entries (e.g., 520-523). In one embodiment, the node entries also include additional metadata or unassigned bits that the operating system or MMU 302 can manipulate.

For the translation of virtual memory address 500, a page table base pointer 513 (e.g., stored in a control register in x86 systems) points to the root node 510 of the page table 311, then the root offset 502 is used to select the entry 520 from the root node 510. Entry 520 provides a key, slab identifier, and hash function identifier, which is used by the hash engine 531 to calculate the address of the child node 511. The child offset 503 is used to select the next entry 521 in the child node 511. Entry 521 provides a key, slab identifier, and hash function identifier that are processed by the hash engine 532 to generate a pointer to the grandchild node 512, and the grandchild offset 504 is used to select the entry 522. Entry 523 provides a key, slab identifier, and hash function identifier that are processed by the hash engine 533 to generate a pointer to the leaf node 513, and the leaf offset 505 is used to select the entry 523. The entry 523 provides a key, slab identifier, and hash function identifier that is processed by the hash engine 534 to generate a pointer to a page 530 within the identified slab. The page offset 506 identifies the location of the data within the page 530. At each node, the calculation of a pointer to the next node based on the key, slab identifier, and hash function identifier from the entry (e.g., 520-523) is performed as previously described with reference to FIG. 4. In one embodiment, the hash engines 531-534 are implemented in hash engine 306 in processing unit 204.

Figure 6A:
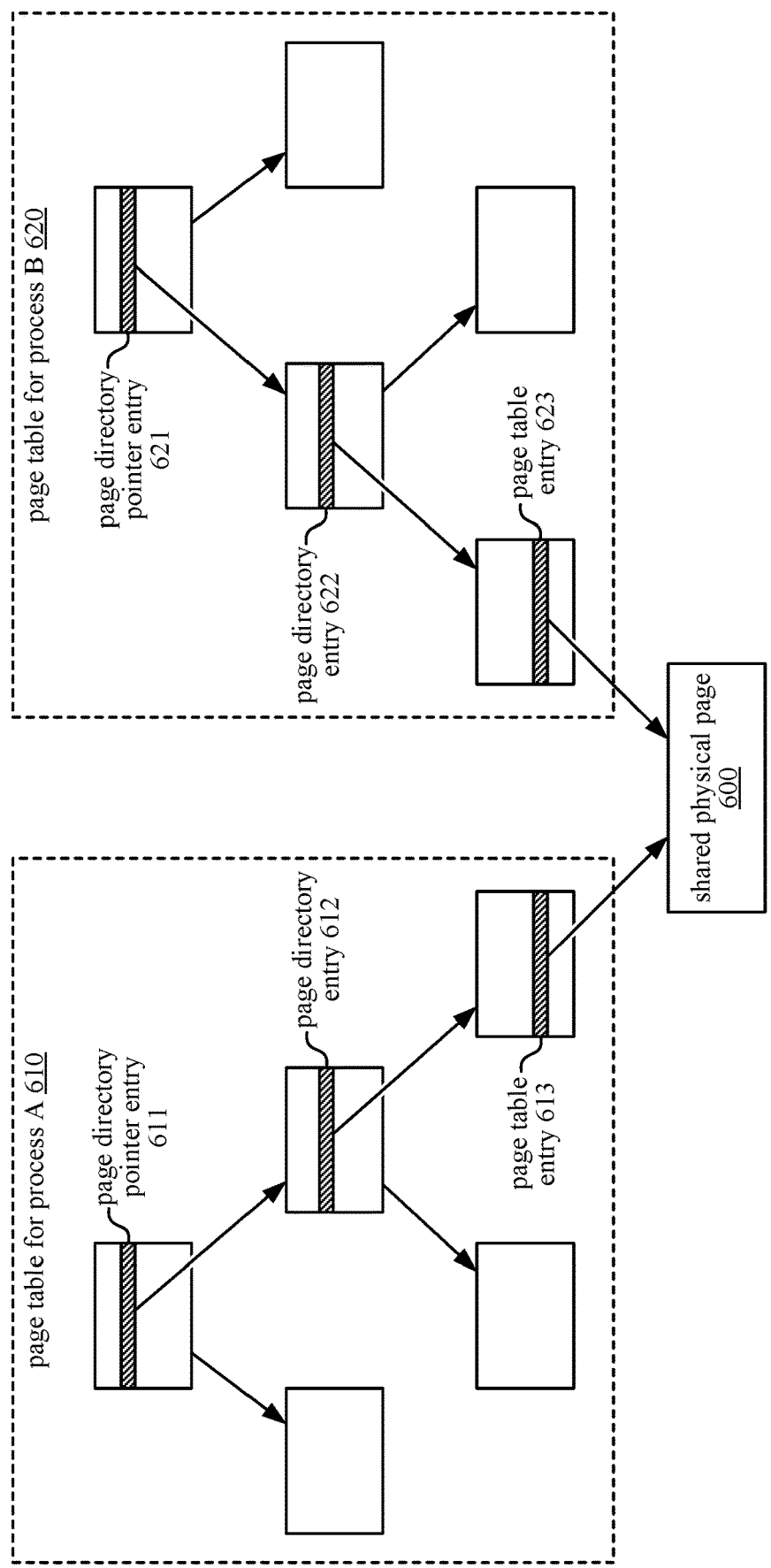
FIG. 6A illustrates sharing of a physical page between two page tables, according to an embodiment.

FIG. 6A illustrates a set of page tables 610 and 620 for two processes A and B that share data in a physical page in a computing device that utilizes the page table hashing mechanism, according to an embodiment. When a process spawns a child via the fork, clone, vfork, or equivalent system calls, the child process inherits a subset of the virtual address space and memory of the parent process (where such a subset can include some or all of the virtual address space and memory). In one embodiment, replication of these inherited virtual pages in physical memory is avoided by marking the shared set of pages as read-only in the page tables of both the child and parent, a process known as the copy-on-write-optimization. A system that supports the copy-on-write optimization is capable of, in two or more different page tables, installing page table entries that point to or address the same physical page.

In one embodiment, the processing unit 204 replicates a process A (e.g., via fork, clone, etc.) to create a child process B that is a copy of process A. The inherited portions of the page table 610 of process A are replicated when creating the page table 620 for the child process B so that the processes A and B can share data in a physical page 600. In page table 610 for process A, starting from the root node, the page directory pointer entry 611, the page directory entry 612, and the page table entry 613 point to the successive nodes leading ultimately to the shared physical page 600, which is referenced by the page table entry 613. Similarly, the nodes in the page table 620 for process B are traversed by following the page directory pointer 621, page directory entry 622, and page table entry 623 to reach the physical page 600 shared with process A.

During the replication process, the per-cacheline shared KEY fields are copied along from the parent page table 610 to the child page table 620 along with their associated entries (including the hash function identifier and slab identifier). Thus, the copied entry remains valid in the new page table 620 because applying the hash function identified by the HASH_FUNCTION_ID to the same KEY will yield the same SLAB_INDEX and therefore yield the same physical address if the slab (or region) information is consistent. The page is additionally marked as read-only in the associated page table entries 613 and 623. In one embodiment, an attempt by one of the processes (e.g., process A) to write to the shared page 600 that has been marked as read-only by the copy-on-write mechanism causes a protection violation that is trapped in the operating system. The shared page 600 is then copied for the process (e.g., process A) attempting the write. A new physical page is allocated for a copy of the page 600 by, in the page table entry (e.g., 613), changing the HASH_FUNCTION_ID so that the SLAB_INDEX is that of a free page within the same slab. If this fails, the page 600 is copied to a different slab or region. After the copy is made, the processes A and B no longer share the originally shared page 600.

A mechanism for sharing physical memory operates in similar fashion as the copy-on-write mechanism. In one embodiment, two different processes that are not clones of each other share a physical memory page by ensuring that, in each of their respective page tables, a page table entry for the shared physical page has the same key, slab (or region) identifier, and hash function identifier. Accordingly, evaluation of the identified hash function on the key will yield the same SLAB_INDEX value and thus the same physical address if the slab identifier refers to the same memory slab.

Figure 6B:
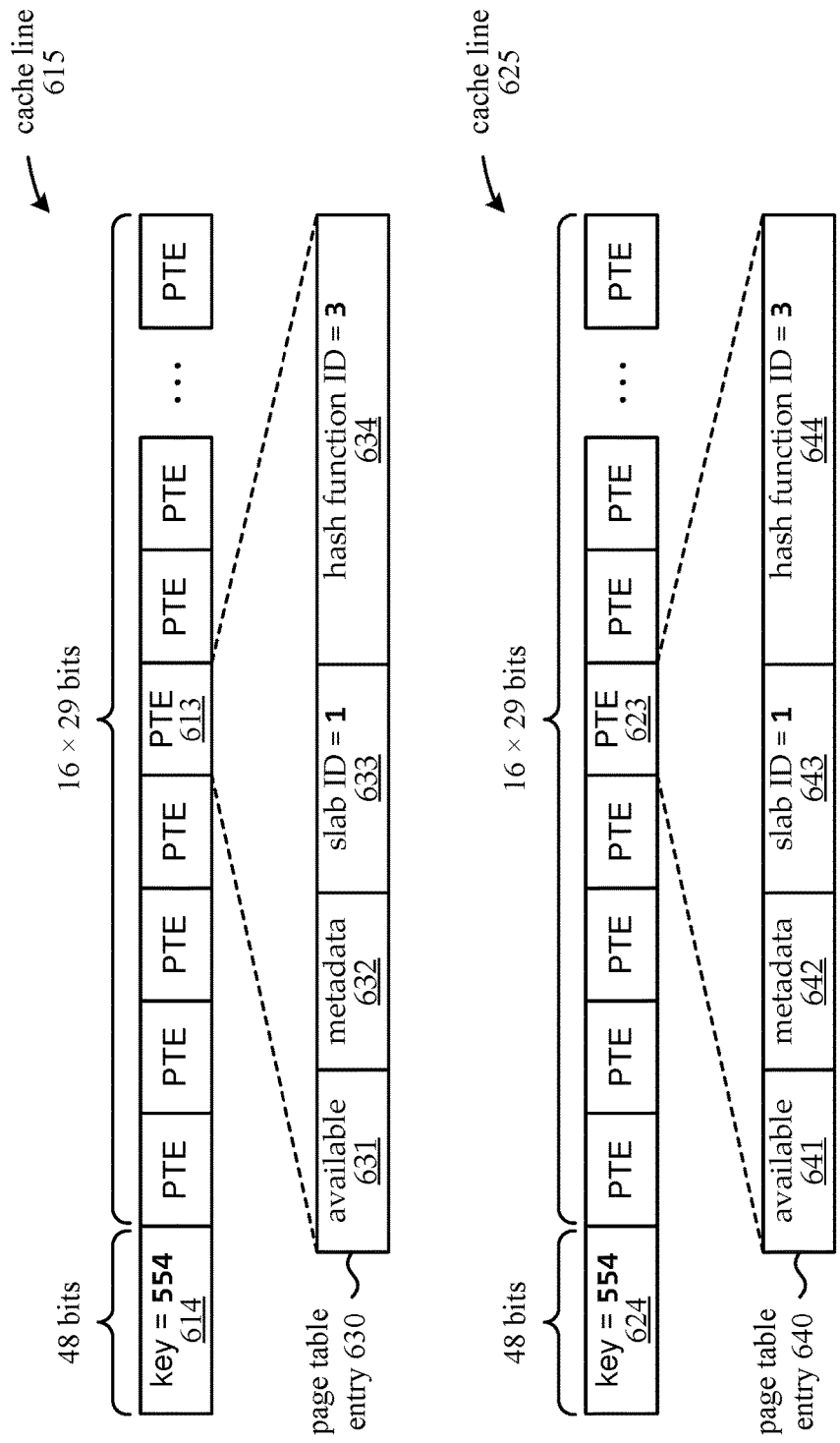
FIG. 6B illustrates page table entries pointing to a shared physical page, according to an embodiment.

FIG. 6B illustrates cache lines 615 and 625 including page table entries 613 and 623 that point to a physical page shared between processes A and B, according to an embodiment in which processes A and B are separate processes (i.e., neither A nor B is derived from a clone or fork of the other process). In FIG. 6B, cache line 615 from the page table 610 for process A includes a key value 614 associated with 16 page table entries in the cache line 615, including the page table entry 613. The cache line 625 from the page table 620 for process B includes a key value 624 associated with 16 page table entries including the page table entry 623. Processes A and B share the same physical page by storing the same key and hash function identifier, and using the same slab table. As shown in FIG. 6B, the key 614 has a value of '554', which is the same as the value for key 624. The slab identifiers 633 and 634 both have a value of '1', and the hash function identifiers 634 and 644 have the same value of '3'. The hash computation therefore generates the same result for both page table entries 630 and 640. Accordingly, these entries point to the same physical page that is shared between processes A and B.

FIG. 7A illustrates an allocation bit vector that facilitates allocation of new physical pages in a computing device that utilizes the page table hashing mechanism, according to an embodiment. In the computing device 101, the operating system maintains a set of free lists 312 identifying physical pages that are free and available for allocating to back new virtual memory pages. When allocating a new page, a key, hash function, and slab are selected, and the previously described hashing computation is performed to determine whether the page referenced by the resulting address is free (as indicated in the free lists 312).

An allocation bit vector 700 is used to facilitate the allocation process. The allocation bit vector 700 is associated with a region of physical memory and, for each physical page having the smallest supported physical page size in the region, the allocation bit vector 700 includes a bit that indicates whether the associated physical page is free. In one embodiment, the bit is '1' when the page is free and '0' when the page is already allocated.

In addition, the hash functions available to the page table hashing mechanism are clustered, so that when given the same inputs, sequential hash functions in a cluster produce sequential outputs. For example, a cluster of 512 hash functions given the same input values produces pointers to 512 contiguous physical pages. CLUSTERED_HASH is one example of a function that achieves this behavior and is shown below:

$$\text{CLUSTERED\_HASH(HASH FUNCTION ID, KEY)} = H(KEY) + G(KEY) \times CLUSTER + CLUSTER\_OFFSET \quad \text{(Equation 3)}$$

$$\text{CLUSTER\_OFFSET} = \text{HASH\_FUNCTION\_ID} \,\&\, (\text{CLUSTER\_SIZE} - 1) \quad \text{(Equation 4)}$$

$$\text{CLUSTER} = \text{HASH\_FUNCTION\_ID} >> \text{LOG2\_CLUSTER\_SIZE} \quad \text{(Equation 5)}$$

In one embodiment, H is an arbitrary base hash function, and G is a lookup table that, for each KEY, returns a prime positive integer greater than the cluster size (so that the sets of outputs generated for different clusters do not overlap). G(KEY) is multiplied by the cluster identifier CLUSTER and defines the separation between sets of output values for different clusters. Other types of functions can also be used to implement G in alternative embodiments.

The CLUSTER_OFFSET is the offset of the hash function identified by HASH_FUNCTION_ID within its cluster, and is calculated by a bitwise AND operation between the HASH_FUNCTION_ID and one less than the CLUSTER_SIZE. Because the CLUSTER_OFFSET is added in the CLUSTERED_HASH function, consecutive HASH_FUNCTION_IDs yield consecutive outputs when the CLUSTERED_HASH function is evaluated. The cluster identifier CLUSTER is obtained by left shifting the HASH_FUNCTION_ID by LOG2_CLUSTER_SIZE (i.e., the base 2 logarithm of the cluster size) to remove the offset component. Clusters in this example are a power of two in size (e.g., 16 or 512 pages).

In one embodiment, the HASH_FUNCTION_ID is a 12-bit field including 3 bits for the cluster identifier CLUSTER (i.e., 8 different clusters) and 9 bits for the CLUSTER_OFFSET (i.e., 512 hash functions per cluster). Each of the 8 candidate clusters maps to 512 pages (i.e., 2 MB page clusters, assuming 4 KB pages) from which allocations can be made. For a cache line size of 64 bytes (or 512 bits), a cache line including the 512 bits of the allocation bit vector 700 corresponding respectively to these contiguous physical pages is used to determine which of the physical pages is free. The free physical pages are then allocated by storing the known corresponding hash function identifiers in a page table entry.

In one embodiment, a subset of the clustered hash functions is evaluated in this manner to determine hash function identifiers that can be used to reference free physical pages. For example, as illustrated in FIG. 7A, $H_0(k)$, $H_1(k)$, $H_2(k)$, and $H_3(k)$ represent a cluster of consecutive hash functions operating on a key k, with the results of the hash computations pointing to four consecutive physical pages. The consecutive physical pages correspond to four consecutive bits in the allocation bit vector 700. Of these, the first two bits are set to '0', indicating that the first two physical pages corresponding to $H_0(k)$ and $H_1(k)$ are already allocated. The last two bits are set to '1', indicating that the last two physical pages corresponding to $H_2(k)$ and $H_3(k)$ are free. Accordingly, the last two physical pages are allocated and are referenced in two new page table entries by the hash function identifiers for $H_2(k)$, and $H_3(k)$, respectively. Both of these hash function identifiers are also associated in the page table with the key k.

In one embodiment, the hashing mechanism supports multiple clusters of hash functions, with each cluster of hash functions including 512 functions. Pages are allocated in different memory locations by using hash functions from different clusters. For performance, the number of hash functions in each cluster is equal to the number of bits in a cache line of the computing device (e.g., 512 hash functions per cluster in a system with 512-bit cache lines). Thus, each of the hash functions in the cluster has a corresponding bit in a cache line of the allocation bit vector 700 when determining which hash function identifiers correspond to free pages.

FIG. 7B illustrates the operation of the RANK and SELECT functions, which facilitate the identifying of free pages that can be allocated for backing a new virtual page, according to an embodiment. The RANK and SELECT functions are performed by the RANK circuit 305 and the SELECT circuit 304, respectively.

Given a bit vector v and an index i, the SELECT function returns the index of the ith least significant bit that is set to '1' when counting from zero. In the example illustrated in FIG. 7B, the SELECT function is provided with 16-bit vector v and an input index of '7'. The SELECT function counts the '1' bits from the least significant end of the bit vector v from 0 to the input index '7' (i.e., counting to the 8th '1' bit in the bit vector v). The 8th '1' bit is at position '11' in the bit vector v. Thus, SELECT(v, 7) returns '11'. As an additional example, SELECT(0b10101010, 3) returns '7' since the fourth '1' bit (since parameter '3' is zero-indexed) occurs at bit position 7 in the vector. Using the same input bit vector, SELECT(0b10101010, 0) would return '1' since the first '1' bit occurs at index 1.

Given a bit vector v and an input index i, the RANK function returns the number of bits prior to index i in the bit vector v that are set to '1'. In the example illustrated in FIG. 7B, the RANK function returns '4' for the input bit vector v and an input index of '7' because 4 bits are set to '1' prior to bit position 7 in the bit vector v.

In one embodiment, when allocating a physical memory page for backing a new virtual page, the operating system selects one of the available clusters of hash functions, which corresponds to a contiguous set of physical memory pages. In this set of physical memory pages, some of the physical memory pages are free while others are already allocated. Accordingly, to allocate a physical memory page within this set of physical pages, the operating system identifies a cache line within the allocation vector that includes the bits indicating which pages in the set are free and which are already allocated. The value '1' is used to encode a free page in the allocation bit vector.

The operating system creates a copy of the cache line and masks out the portion of the copy that does not correspond to the set of physical pages addressable by the hash cluster. The resulting bit vector is used as an input v to the SELECT function. The operating system calculates SELECT(v, 0) to obtain the index of the zeroth '1'. If the index is outside of the indices associated with the hash function cluster (e.g., a cluster spans bits 64 to 127 of the allocation bit vector cache line where the SELECT function returns an index of 512), then all of the physical pages addressable by the hash function cluster have already been allocated (i.e., none of the pages are free). In one embodiment, an initial check is used to ascertain whether the set of physical pages for a cluster is already full by checking whether the corresponding bits in the allocation bit vector all have a value of '0', indicating that all of the pages are already allocated.

When attempting to allocate multiple pages within a set of physical pages addressable by the hash function cluster, the RANK operation can be called on the portion of the allocation bit vector associated with the hash function cluster to calculate the number of free pages in the set. If the returned value is less than the number of pages that need to be allocated, the pages can be allocated using a different cluster of hash functions that has spare capacity, or the allocation can be split across multiple clusters.

In one embodiment, the operating system maintains a cluster occupancy vector, which includes a counter for each cluster of hash functions that tracks the number of free and unavailable pages associated with the cluster. In one embodiment, the counters are relatively short so that many counters are packed into a single cache line. If multiple candidate clusters reside within a short distance of one another, then fetching a single cache line from the cluster occupancy vector would likely be sufficient for identifying a cluster that can be used to allocate the pages.

Each entry in the page table stores a hash function identifier that can identify any of a large number of candidate hash functions; therefore, each entry can select from any of a correspondingly large number of candidate physical pages to back the virtual page. Thus, the probability that a virtual page cannot be assigned a physical page is very low, and is mitigated by the ability to allocate a physical page in a different slab or region.

Figure 7C:
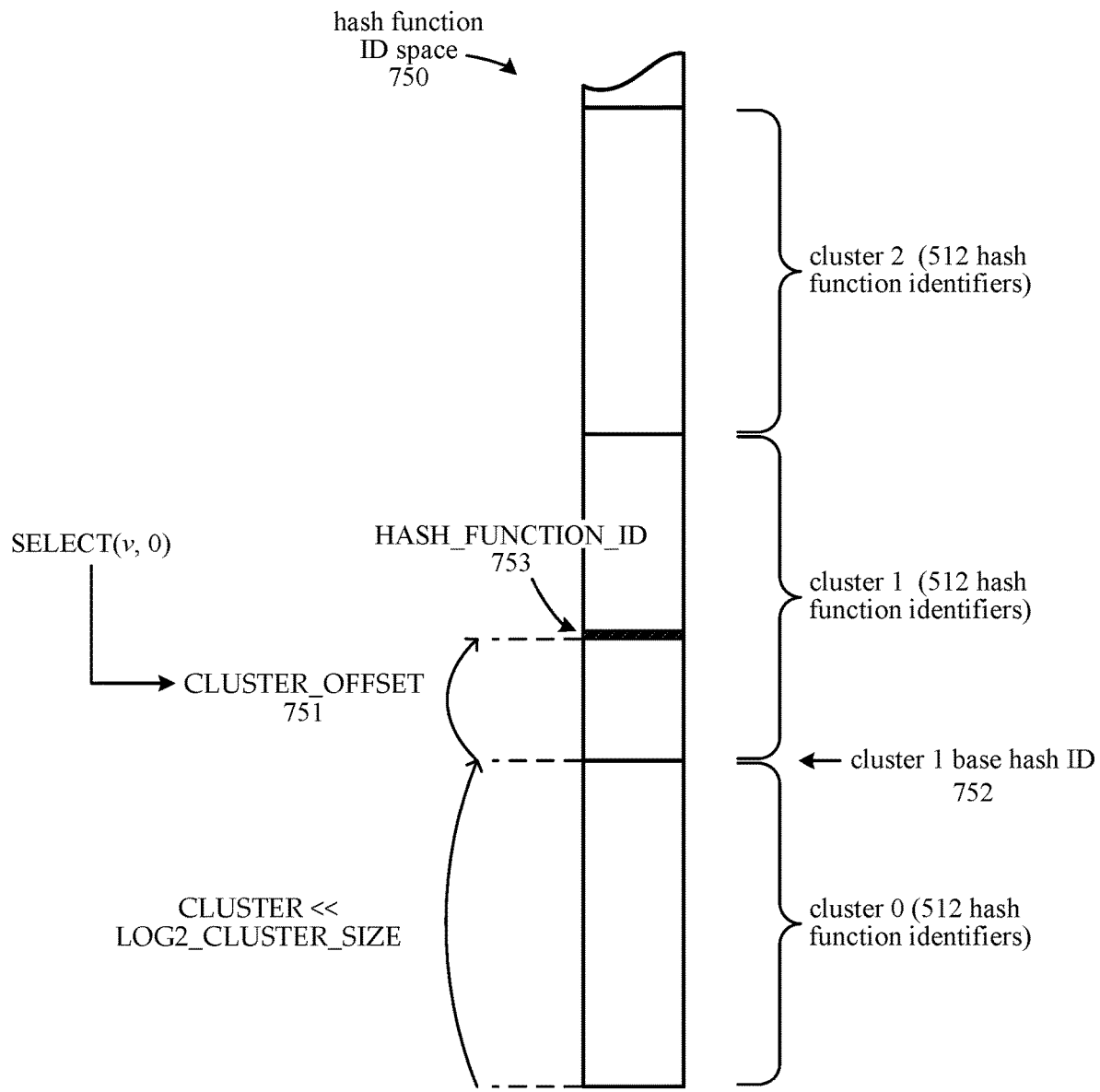
FIG. 7C illustrates the calculation of a hash function identifier, according to an embodiment.

FIG. 7C illustrates how the hash function identifier is calculated from performing the SELECT operation on a portion of the allocation bit vector, according to an embodiment. As previously described, the function SELECT(v, 0) is performed on a portion v of the allocation corresponding to the hash function cluster in order to obtain the index of the zeroth '1' bit in v. The return value of the SELECT function indicates the cluster offset 751. This value may be shifted to account for any difference between the beginning of the allocation bit vector cache line and the beginning of v. The hash function identifier is calculated according to the Equation 6 below:

HASH FUNCTION ID=CLUSTER_OFFSET|
  (CLUSTER<<LOG2_CLUSTER_SIZE)  (Equation 6)

In Equation 6, CLUSTER is an identifier that identifies the cluster of hash functions selected for performing the allocation. FIG. 7C illustrates a hash function identifier space 750 that includes at least three clusters of hash function identifiers, numbered 0, 1, and 2. Each of the clusters 1, 2, and 3 includes 512 hash function identifiers. LOG2_OF_CLUSTER_SIZE is the base 2 logarithm of the size of each cluster of hash functions (i.e., the number of hash functions in each cluster). Continuing the previous example, LOG2_OF CLUSTER_SIZE is equal to 9 for clusters including 512 (i.e., 29) hash function identifiers. According to Equation 6, the CLUSTER value of '1' is bit-shifted left by 9 places to obtain an identifier 752 of the base hash function of the cluster. The cluster offset 751 is added to the base hash function identifier 752 via a bitwise OR operation to obtain HASH_FUNCTION_ID 753, which is recorded in the page table entry as, for example, hash function ID 414.

Figure 8A:
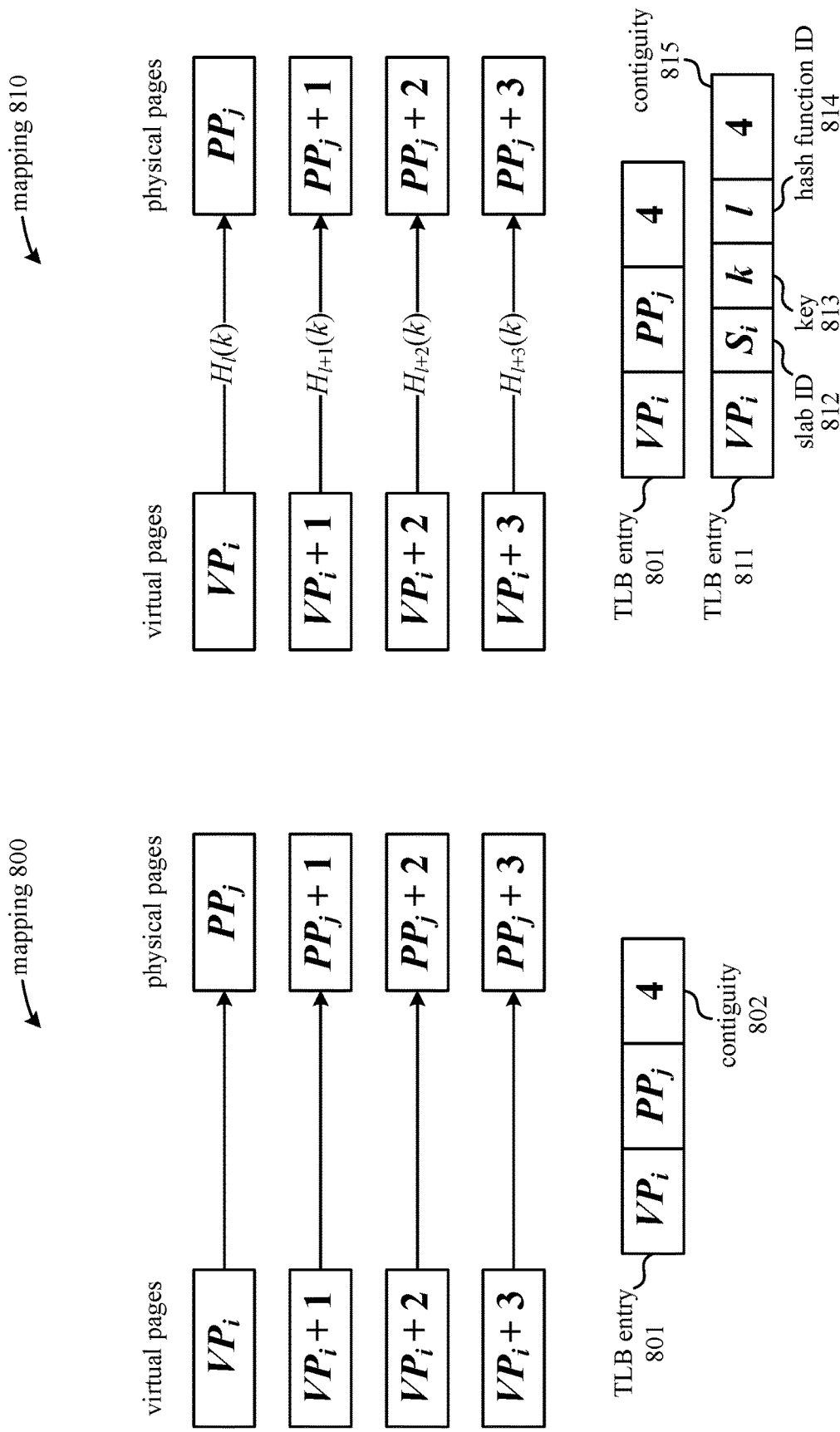
FIGS. 8A and 8B illustrate mappings of virtual memory pages to physical memory pages in a translation lookaside buffer, according to an embodiment.

FIG. 8A illustrates mappings of virtual memory pages to physical memory pages in a translation lookaside buffer (TLB) 303, according to an embodiment. The TLB 303 is a buffer used for virtual to physical memory address translation that caches entries from the page table 311. In one embodiment, the TLB 303 implements a coalescing mechanism by which a single TLB entry (e.g., 801) provides translations for multiple consecutive virtual page numbers to respective multiple consecutive physical page numbers. The TLB entry 801 includes an initial virtual page number $VP_i$, a corresponding initial physical memory page number $PP_j$, and a contiguity value 802, which indicates the number of consecutive virtual memory pages to map to consecutive physical memory pages, starting from VP and $PP_j$. The contiguity field 802 has a value of '4'; accordingly, TLB entry 801 indicates a respective mapping 800 of 4 consecutive virtual page numbers $VP_i$, $VP_i+1$, $VP_2+2$, and $VP_i+3$ to 4 consecutive physical page numbers $PP_j$, $PP_j+1$, $PP_j+2$, and $PP_j+3$.

In one embodiment, hash function clustering enables the use of page table entry coalescing in translation look-aside buffers when the hashed address representations are used. In mapping 810, the same virtual page numbers $VP_i$, $VP_i+1$, $VP_i+2$, and $VP_i+3$ are mapped to the same physical page numbers $PP_j$, $PP_j+1$, $PP_j+2$, and $PP_j+3$ via clustered hash functions $H_l(k)$, $H_{l+1}(k)$, $H_{l+2}(k)$, and $H_{l+3}(k)$, respectively. These hash functions are consecutive hash functions from the same cluster and operating on the same key k. When the mapping 810 has been generated using a clustered hashing mechanism, the TLB entry 801 still indicates the correct mapping of virtual pages to physical pages, since the clustered hash functions map consecutive virtual pages to consecutive physical pages.

In an alternative embodiment, a TLB entry 811 includes a slab identifier 812, a key 813, and a hash function identifier 814 instead of the physical page $PP_j$. The translation of the initial virtual page VP to its physical page $PP_j$ is determined using the recorded values in the slab identifier 812, key 813, and hash function identifier 814 fields. Additional consecutive virtual pages (up to the total indicated in the contiguity field 815) are translated using the next sequential hash functions in the cluster following the recorded hash function identifier 814.

Figure 8B:
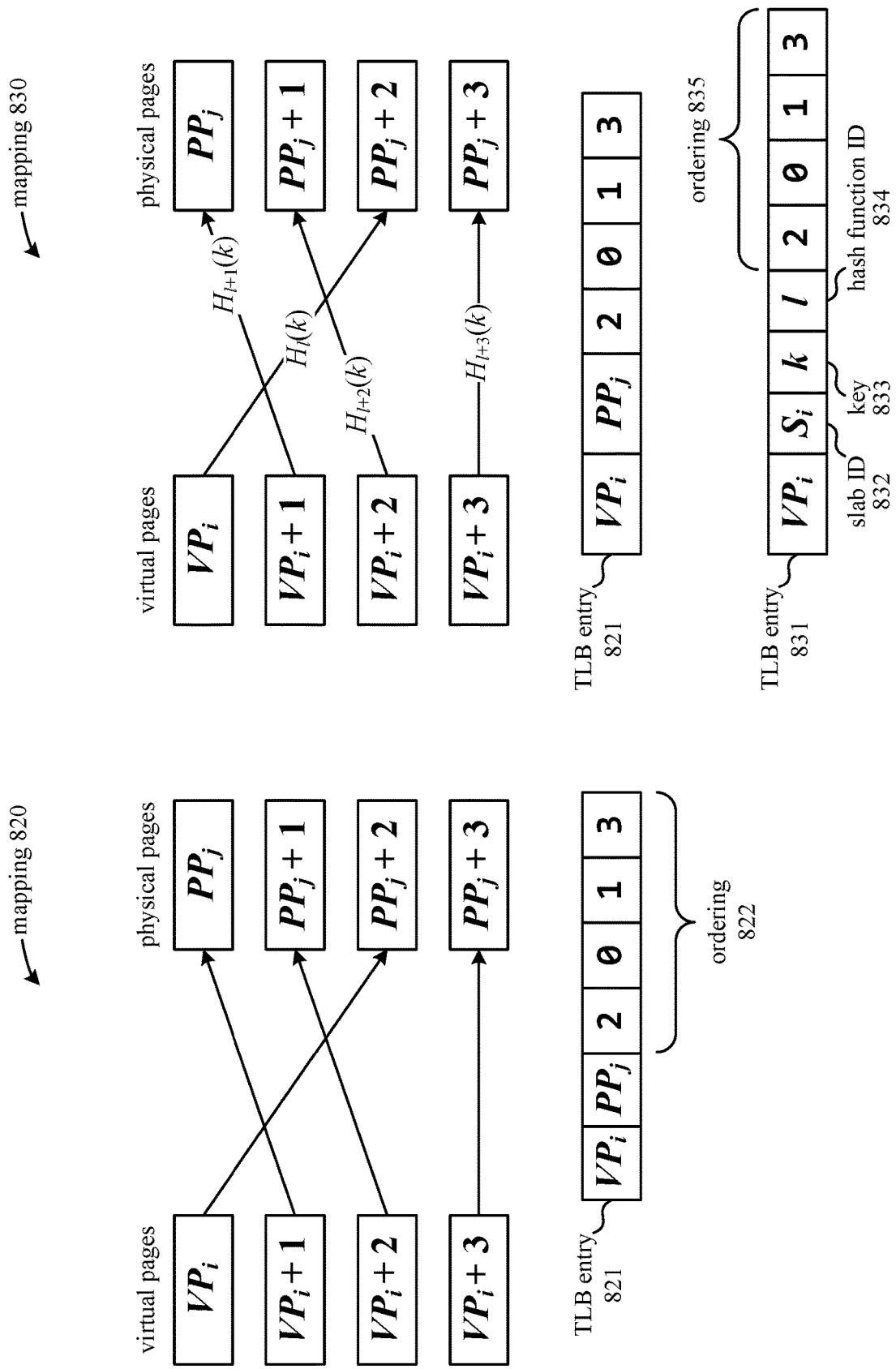

FIG. 8B illustrates additional mappings of virtual memory pages to physical memory pages in a translation lookaside buffer (TLB) 303, according to an embodiment. In the mapping 820, virtual pages numbered $VP_i$, $VP_i+1$, $VP_i+2$, and $VP_i+3$ are mapped to physical page numbers $PP_j+2$, $PP_j$, $PP_j+1$, and $PP_j+3$, respectively, by TLB entry 821. This mapping is indicated in the ordering field 822 of TLB entry 821, in which the values 2, 0, 1, and 3 represent a permuted non-sequential order for the physical pages $PP_j+2$, $PP_j$, $PP_j+1$, and $PP_j+3$, respectively, that are mapped to sequential virtual page numbers starting from $VP_i$.

Mapping 830 is effected in a system that implements the hashed address representation; accordingly, the virtual pages $VP_i$, $VP_i+1$, $VP_i+2$, and $VP_i+3$ are mapped to physical page numbers $PP_j+2$, $PP_j$, $PP_j+1$, and $PP_j+3$ via respective hash functions $H_{i+2}(k)$, $H_i(k)$, $H_{i+1}(k)$, and $H_{i+3}(k)$. TLB entry 821 still indicates the correct mapping of virtual pages to physical pages, since the clustered hash functions do not change the order of the physical pages being mapped. An alternate format for a TLB entry 831 includes a slab identifier 832, a key 833, and a hash function identifier 834 instead of the physical page $PP_j$. The ordering field 835 in the TLB entry 831 contains the values 2, 0, 1, and 3, which are used as offsets that, when added to the base hash function identifier 834, provide the hash function identifiers $H_{i+2}(k)$, $H_i(k)$, $H_{i+1}(k)$, and $H_{i+3}(k)$ for producing the mapping 830.

Figure 9:
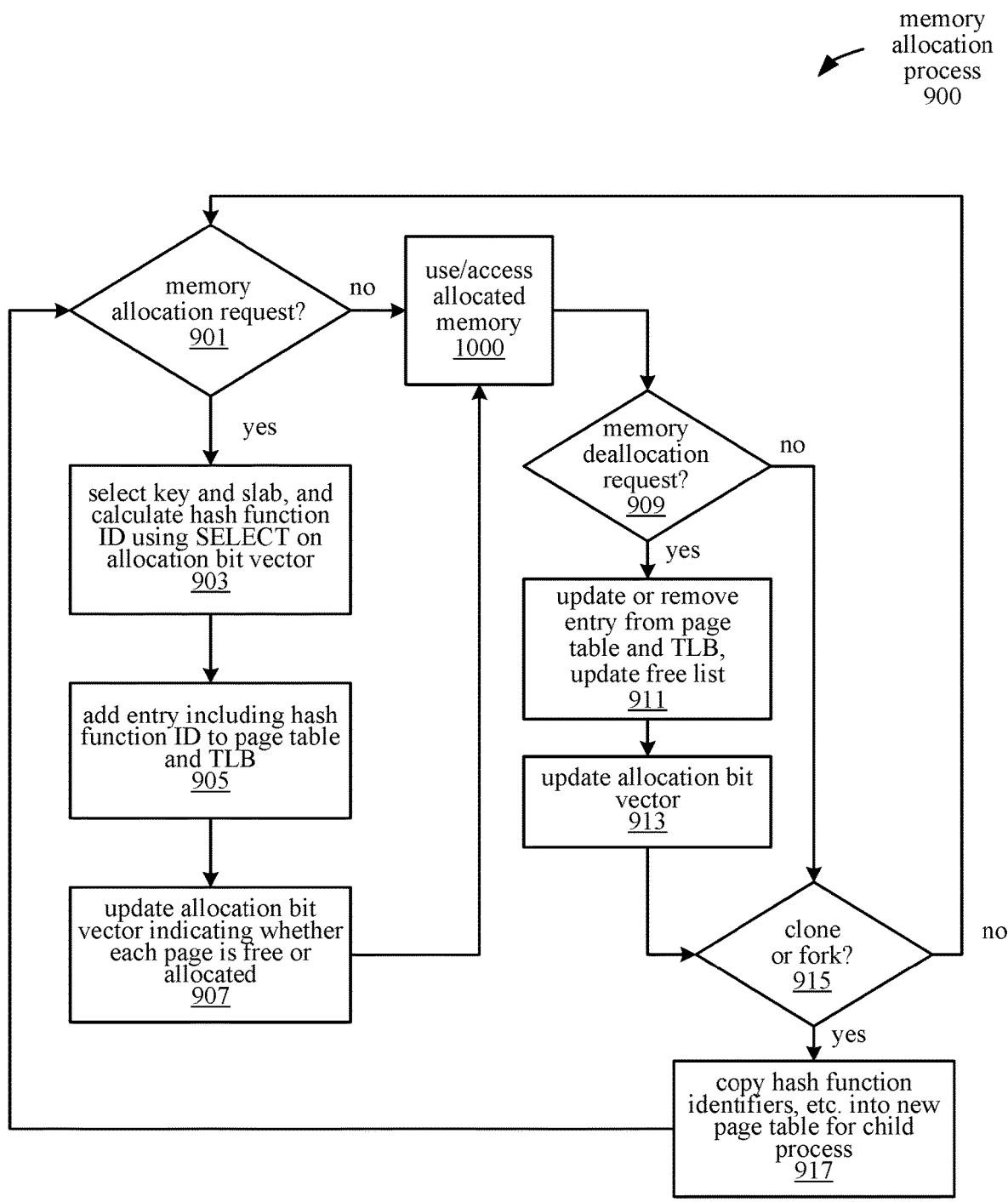
FIG. 9 is a flow diagram illustrating a memory allocation and deallocation process, according to an embodiment.

FIG. 9 illustrates a process 900 for allocating and deallocating memory in the computing system 200, according to an embodiment. The process 900 is performed by components in the computing system 200 (e.g., the processor 301 and MMU 302) to allocate physical memory in the main memory 206 to one or more virtual pages.

At block 901, if memory allocation is not requested, then no allocation is performed, and the system continues to use and access already allocated memory, as provided at block 1000. At block 901, if a memory allocation is requested, the operating system (executed by the processor 301) allocates physical memory from the main memory 206 according to blocks 903-909. In blocks 903-905, entries (e.g., 520-523) are added to each of one or more nodes in the page table 311 (including at least a leaf node 513) that refer to the newly allocated physical pages.

At block 903, the operating system selects a key value and a slab from which the physical pages will be allocated, then calculates a hash function identifier for addressing the physical pages. In one embodiment, a hash function cluster is selected for performing the allocation, and one or more hash function identifiers that identify hash functions in the cluster that can be used for addressing sufficient free physical pages for the allocation are calculated by performing a SELECT operation based on the associated portion of allocation bit vector 700. In one embodiment, if no free physical pages are found using the selected hash function cluster, the selected key and slab are changed or a different hash function cluster is selected, and block 903 is repeated until a suitable set of free physical pages is found.

At block 905, the operating system adds a page table entry 410 to a leaf node 513 of the page table 311. The entry is associated with the key value 401 and also associates the slab identifier 413 for the selected slab with the hash function identifier 414. The entry also includes AVAILABLE bits 411 and METADATA 412. A page table entry is similarly added for any other physical pages being allocated. In one embodiment, each of the new page table entries stores a different hash function identifier and is associated with the same key value 401. Leaf node 513, grandchild node 512, child node 511, and root node 510 are created if they do not already exist, and entries are installed in each of these node levels that point to the appropriate node in the next level. In one embodiment, the new entries in each node level are created in a similar manner as provided at block 903. In one embodiment, the operating system also adds corresponding entries to the TLB 301.

At block 907, the allocation bit vector 700 is updated to reflect the new physical page allocations. A deasserted bit (i.e., set to '0') is stored for each allocated page, and an asserted bit (i.e., set to '1') is stored for each free page in the physical memory region associated with the allocation bit vector 700. At block 1000, the requested allocation is complete, and the allocated memory is used to store application data.

At block 909, if memory deallocation is requested, the operating system frees one or more of the previously allocated physical pages by performing the operations in blocks 911-913. At block 911, entries referring to the physical memory pages being deallocated are marked as invalid or removed from the page table 311 and TLB 303 and the freed pages are added to a free list to be made available for future allocations. At block 913, the allocation bit vector 700 is updated to indicate that the pages are free by asserting the bits corresponding to the freed pages.

The process 900 continues at block 915 from block 913, or from block 909 if no deallocation is requested. At block 915, if a clone, fork, or other operation is invoked to replicate a process, then for each entry in the page table associated with the original parent process, the operating system copies the entry (including hash function identifiers, slab identifiers, etc.) to a new page table associated with the new child process. The new entries are also associated with identical key values in the new page table. Since the new page table contains entries storing the same information as the original page table, the original physical pages of the parent process are shared between the parent and child processes. The shared pages are designated as 'read only' so that the copy-on-write mechanism will be invoked if either process attempts to modify the shared pages. The process 900 returns to block 901 from block 917, or from block 915 if no clone or fork operation is performed.

Figure 10:
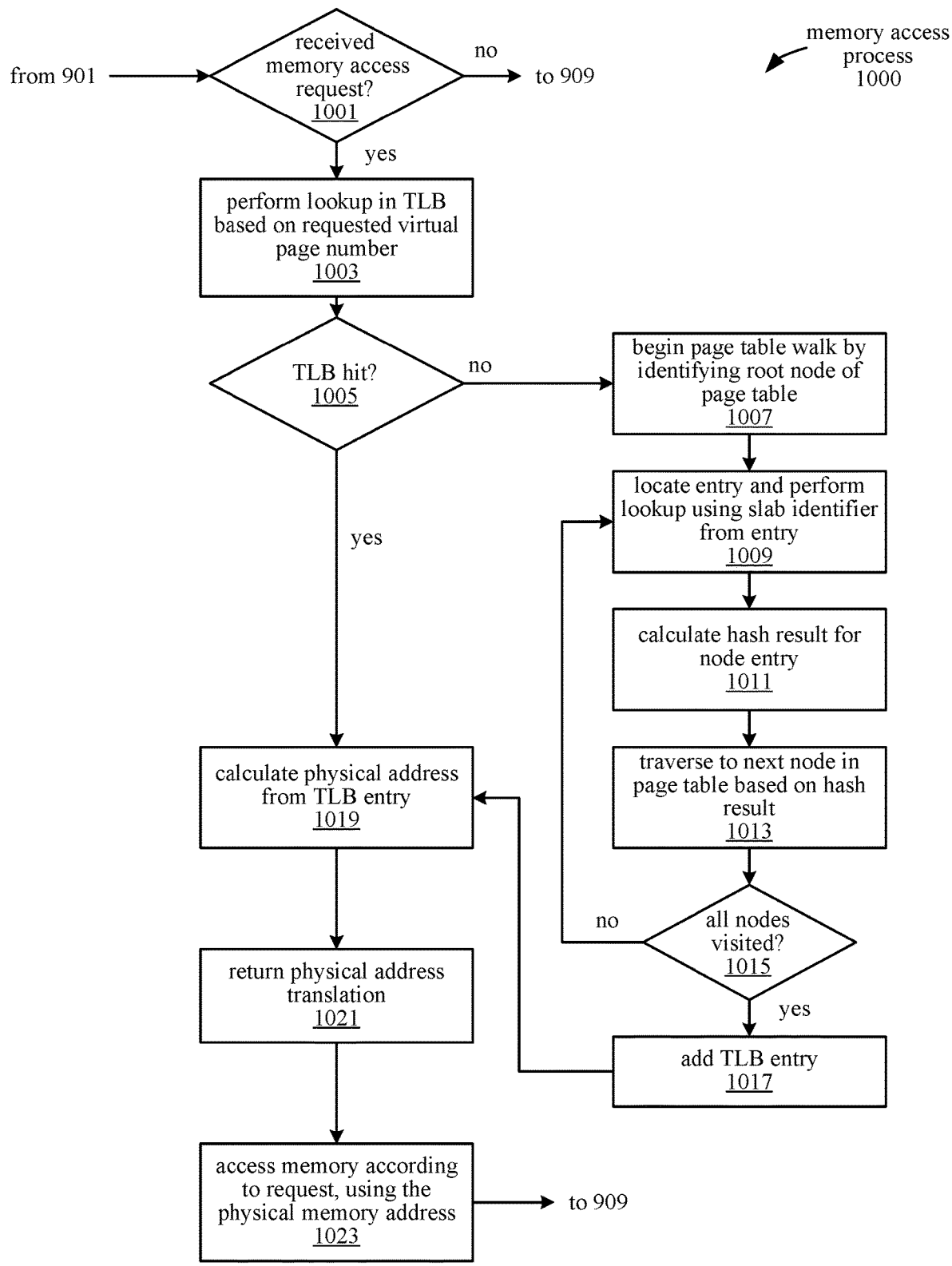
FIG. 10 is a flow diagram illustrating a process for accessing memory, according to an embodiment.

FIG. 10 illustrates a process 1000 for accessing allocated memory, according to an embodiment. Process 1000 corresponds to block 1000 in process 900. At block 1001, if a memory access request (e.g., from a load or store instruction) is not received, the process 1000 continues to block 909 in process 900. Otherwise, if a memory access request is received at block 1001, the process 1000 services the memory request according to blocks 1003-1023.

At block 1003, the processing unit 204 performs a lookup in the TLB 303 of the virtual page number 507 from the received virtual memory address 500. If the TLB does not contain an entry for the virtual page number 507, the process continues from block 1005 to block 1007. The MMU 302 performs a page table walk by traversing a sequence of nodes in the page table 311 to translate the virtual page number to a physical page number in blocks 1007-1015. At block 1007, the root node 513 of the page table 311 is located by following the page table base pointer 513 associated with the process from which the memory access request originated.

At block 1009, the root offset 502 is used to locate the entry 520 in the root node 510. The slab identifier from entry 520 is used to perform a lookup in a slab table to determine a slab allocation size, a slab size, and an offset (i.e., base address) of a slab containing the next node. At block 1011, the hash function identifier in the entry 520 is used to identify a hash function that is executed on a key associated with the entry 520. The hashing operation is performed in hash engine 531. A modulo operation is performed with the result of the hashing operation and the slab size to obtain the location of the next node 511. At block 1013, the MMU 302 visits the next node in the sequence based on the calculated location.

If all of the nodes have not been visited, the process 1000 returns from block 1015 to block 1009. At block 1009, the entry 521 is located in the child node 511 being visited based on the next bit substring of the virtual page number 507, which is child offset 503. Blocks 1009-1015 thus repeat for each of the node levels in the page table 311 to, for each node being visited, use the next bit substring (e.g., 502-505) in the virtual page number 507 to locate the correct entry (e.g., 520-523) that points to the next node in the traversal sequence. When all of the nodes have been visited (i.e., the physical page corresponding to the virtual page number 507 has been reached), then the process 1000 continues from block 1015 to block 1017.

At block 1017, the association between virtual page number 507 and the physical page number identified from the page table walk is recorded in the TLB 303. In various embodiments, the association is recorded in a similar format as one of the TLB entries 801, 811, 821, and 831 shown in FIGS. 8A and 8B, or is recorded using another TLB entry format. At block 1019, the physical address of the physical page is calculated from the newly installed TLB entry. At block 1021, the MMU 302 adds the page offset 506 from the virtual memory address 500 to the physical page, and returns this final physical address translation.

At block 1005, if the TLB 303 contains an entry for the virtual page, then a TLB hit occurs, and the process 1000 continues at block 1019. At block 1019, the processing unit 204 calculates a physical address based on the TLB entry for the virtual page. In one embodiment, the TLB entry 801 includes a contiguity field 802 to support TLB coalescing, so that the physical page is obtained as one of the consecutive physical pages $PP_j$, $PP_j+1$, $PP_j+2$, and $PP_j+3$ that map to consecutive virtual pages $VP_j$, $VP_j+1$, $VP_j+2$, and $VP_j+3$, respectively. In one embodiment, the TLB entry 811 includes a slab identifier 812, a key 813, a hash function identifier 814, and a contiguity field 815 from which the physical page is computed. The page offset 506 is added to the physical page number to generate the physical memory address corresponding to the requested virtual memory address 500.

At block 1023, once the virtual memory address 500 has been translated to the physical memory address (by entries from the TLB 303 or the page table 311), the memory request accesses the memory 206 at the returned physical memory address according to the original memory request (e.g., by retrieving application data from or writing application data to the physical memory address). By the operation of the above processes 900 and 1000, the computing system 200 thus supports the addressing of nodes in a tree-based page table using a hashed address representation.

A device includes an address translation table to, in each node of a set of nodes in the address translation table, store a key value and a hash function identifier, a hash engine coupled with the address translation table to, for each node in the set of nodes, calculate a hash result for the key value by executing a hash function identified by the hash function identifier, and a processing unit coupled with the hash engine to, in response to a request to translate a virtual memory address to a physical memory address, identify a physical memory region corresponding to the virtual memory address based on the calculated hash result for each node in the set of nodes.

In the device, the address translation table, for each key value stored in the address translation table, associates the key value with a plurality of hash function identifiers including the hash function identifier.

In the device, the processing unit further includes a memory management unit to, in response to the request, traverse the address translation table according to a sequence of the set of nodes by, for each node in the set of nodes, identifying a next node in the sequence based on the hash result calculated for the node.

In the device, the set of nodes includes a leaf node. The leaf node includes a set of entries each associating a slab identifier with the hash function identifier for the leaf node. The processing unit identifies the physical memory region corresponding to the virtual memory address by, based on a lookup of the slab identifier in a slab table, determining a slab allocation size, a slab size, and a base address of a slab identified by the slab identifier, and calculating the physical memory address based on the slab allocation size, the slab size, the base address, and the hash result calculated for the leaf node.

In the device, the processing unit, for a parent process associated with the address translation table, creates a child process that is a copy of the parent process by, for each node in the set of nodes, creating a copy of the hash function identifier in a new address translation table associated with the child process, and associating the copy with the key value of the node.

In the device, for each node of the plurality of nodes, the hash function identified by the hash function identifier is one of a plurality of clustered hash functions executable by the hash engine to calculate a set of sequential hash values based on the key value.

The device also includes an allocation bit vector associated with a physical memory region to store a deasserted bit for each allocated page in the physical memory region, and an asserted bit for each free page in the physical memory region. The device also includes a SELECT circuit to, for a leaf node in the set of nodes, calculate the hash function identifier of the leaf node by performing a SELECT function based on the allocation bit vector.

The device also includes an address translation buffer to associate a virtual page number of the virtual memory address with a slab identifier, the key value, and the hash function identifier of a leaf node of the set of nodes in the address translation table.

In the device, the hash function identifier identifies a base hash function of a set of clustered hash functions. The address translation buffer associates a virtual page number of the virtual memory address with a plurality of hash function offsets. The processing unit calculates a plurality of physical memory addresses by, for each hash function offset of the plurality of hash function offsets, executing one of the set of clustered hash functions identified by a sum of the hash function offset and the hash function identifier.

A method includes, in each node of a set of nodes in an address translation table, storing a key value and a hash function identifier, for each node in the set of nodes, calculating a hash result for the key value by executing a hash function identified by the hash function identifier, and in response to a request to translate a virtual memory address to a physical memory address, identifying a physical memory region corresponding to the virtual memory address based on the calculated hash result for each node in the set of nodes.

The method also includes, for each key value stored in the address translation table, associating the key value with a plurality of hash function identifiers including the hash function identifier.

The method also includes, in response to the request, traversing the address translation table according to a sequence of the set of nodes by, for each node in the set of nodes, identifying a next node in the sequence based on the hash result calculated for the node.

The method also includes in each entry of a set of entries in a leaf node in the set of nodes, associating a slab identifier with the hash function identifier of the leaf node, and identifying the physical memory region corresponding to the virtual memory address by, based on a lookup of the slab identifier in a slab table, determining a slab allocation size, a slab size, and a base address of a slab identified by the slab identifier, and calculating the physical memory address based on the slab allocation size, the slab size, the base address, and the hash result calculated for the leaf node.

The method also includes, for a parent process associated with the address translation table, creating a child process that is a copy of the parent process by, for each node in the set of nodes, creating a copy of the hash function identifier in a new address translation table associated with the child process, and associating the copy with the key value of the node.

In the method, for each node of the plurality of nodes, the hash function identified by the hash function identifier is one of a plurality of clustered hash functions executable by the hash engine to calculate a set of sequential hash values based on the key value. The method also includes, in an allocation bit vector associated with a physical memory region, storing a deasserted bit for each allocated page in the physical memory region, and an asserted bit for each free page in the physical memory region, and for a leaf node in the set of nodes, calculating the hash function identifier of the leaf node by performing a SELECT function based on the allocation bit vector.

The method also includes, in an address translation buffer, associating a virtual page number of the virtual memory address with a slab identifier, the key value, the hash function identifier of a leaf node in the set of nodes, and a plurality of hash function offsets, where the hash function identifier identifies a base hash function of a set of clustered hash functions, and calculating a plurality of physical memory addresses by, for each hash function offset of the plurality of hash function offsets, executing one of the set of clustered hash functions identified by a sum of the hash function offset and the hash function identifier.

A computing system includes a memory system to store an address translation table. The address translation table, in each node of a set of nodes in the address translation table, stores a key value and a hash function identifier. The computing system also includes a processing unit to, for each node in the set of nodes, calculate a hash result for the key value by executing a hash function identified by the hash function identifier, and in response to a request to translate a virtual memory address to a physical memory address, identify a physical memory region in the memory system corresponding to the virtual memory address based on the calculated hash result for each node in the set of nodes.

In the computing system, the set of nodes includes a leaf node. The leaf node includes a set of entries each associating a slab identifier with the hash function identifier for the leaf node. The processing unit identifies the physical memory region corresponding to the virtual memory address by based on a lookup of the slab identifier in a slab table, determining a slab allocation size, a slab size, and a base address of a slab identified by the slab identifier, and calculating the physical memory address based on the slab allocation size, the slab size, the base address, and the hash result calculated for the leaf node.

In the computing system, the processing unit, after identifying the physical memory region in the memory system corresponding to the virtual memory address, retrieves application data from the identified physical memory region.

The computing system also includes a plurality of computing devices, where the memory system includes a plurality of memory devices each residing in a different one of the plurality of computing devices. The processing device resides in one of the plurality of computing devices, and the physical memory region is located in a different computing device than the processing device.

In the foregoing embodiments, bits can be asserted high (e.g., set to '1') and deasserted low (e.g., set to '0'); alternatively, other values or electrical states can be used to represent asserted and deasserted states (e.g., asserted low and deasserted high). The term "identifier" can refer to an index value, name, or other value used to identify an entity (e.g., a function, memory location, etc.). As used herein, the term "coupled to" may mean coupled directly or indirectly through one or more intervening components. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Certain embodiments may be implemented as a computer program product that may include instructions stored on a non-transitory computer-readable medium. These instructions may be used to program a general-purpose or special-purpose processor to perform the described operations. A computer-readable medium includes any mechanism for storing or transmitting information in a form (e.g., software, processing application) readable by a machine (e.g., a computer). The non-transitory computer-readable storage medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory, or another type of medium suitable for storing electronic instructions.

Additionally, some embodiments may be practiced in distributed computing environments where the computer-readable medium is stored on and/or executed by more than one computer system. In addition, the information transferred between computer systems may either be pulled or pushed across the transmission medium connecting the computer systems.

Generally, a data structure representing the computing system 100 and/or portions thereof carried on the computer-readable storage medium may be a database or other data structure which can be read by a program and used, directly or indirectly, to fabricate the hardware including the computing system 100. For example, the data structure may be a behavioral-level description or register-transfer level (RTL) description of the hardware functionality in a high level design language (HDL) such as Verilog or VHDL. The description may be read by a synthesis tool which may synthesize the description to produce a netlist including a list of gates from a synthesis library. The netlist includes a set of gates which also represent the functionality of the hardware including the computing system 100. The netlist may then be placed and routed to produce a data set describing geometric shapes to be applied to masks. The masks may then be used in various semiconductor fabrication steps to produce a semiconductor circuit or circuits corresponding to the computing system 100. Alternatively, the database on the computer-readable storage medium may be the netlist (with or without the synthesis library) or the data set, as desired, or Graphic Data System (GDS) II data.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be in an intermittent and/or alternating manner.

In the foregoing specification, the embodiments have been described with reference to specific exemplary embodiments thereof. It will, however, be evident that various modifications and changes may be made thereto without departing from the broader scope of the embodiments as set forth in the appended claims. The specification and drawings are, accordingly, to be regarded in an illustrative sense rather than a restrictive sense.

What is claimed is:

1. A device, comprising:
an address translation table configured to, in each node of a set of nodes in the address translation table, store a key value and a hash function identifier;
a hash engine coupled with the address translation table and configured to, for each node in the set of nodes, calculate a hash result for the key value by executing a hash function identified by the hash function identifier; and
a processing unit coupled with the hash engine and configured to, in response to a request to translate a virtual memory address to a physical memory address, identify a physical memory region corresponding to the virtual memory address based on the calculated hash result for each node in the set of nodes.

2. The device of claim 1, wherein the address translation table is further configured to, for each key value stored in the address translation table, associate the key value with a plurality of hash function identifiers including the hash function identifier.

3. The device of claim 1, wherein the processing unit further comprises a memory management unit configured to:
in response to the request, traverse the address translation table according to a sequence of the set of nodes by, for each node in the set of nodes, identifying a next node in the sequence based on the hash result calculated for the node.

4. The device of claim 1, wherein:
the set of nodes comprises a leaf node;
the leaf node comprises a set of entries each associating a slab identifier with the hash function identifier for the leaf node; and
the processing unit is further configured to identify the physical memory region corresponding to the virtual memory address by:
based on a lookup of the slab identifier in a slab table, determine a slab allocation size, a slab size, and a base address of a slab identified by the slab identifier, and
calculate the physical memory address based on the slab allocation size, the slab size, the base address, and the hash result calculated for the leaf node.

5. The device of claim 1, wherein the processing unit is further configured to:
for a parent process associated with the address translation table, create a child process that is a copy of the parent process by, for each node in the set of nodes,
creating a copy of the hash function identifier in a new address translation table associated with the child process, and
associating the copy with the key value of the node.

6. The device of claim 1, wherein:
for each node of the plurality of nodes, the hash function identified by the hash function identifier is one of a plurality of clustered hash functions executable by the hash engine to calculate a set of sequential hash values based on the key value.

7. The device of claim 1, further comprising:
an allocation bit vector associated with a physical memory region and configured to store:
a deasserted bit for each allocated page in the physical memory region, and
an asserted bit for each free page in the physical memory region; and
a SELECT circuit configured to, for a leaf node in the set of nodes, calculate the hash function identifier of the leaf node by performing a SELECT function based on the allocation bit vector.

8. The device of claim 1, further comprising:
an address translation buffer configured to associate a virtual page number of the virtual memory address with a slab identifier, the key value, and the hash function identifier of a leaf node of the set of nodes in the address translation table.

9. The device of claim 1, wherein:
the hash function identifier identifies a base hash function of a set of clustered hash functions;
the address translation buffer is further configured to associate a virtual page number of the virtual memory address with a plurality of hash function offsets; and
the processing unit is further configured to calculate a plurality of physical memory addresses by, for each hash function offset of the plurality of hash function offsets, executing one of the set of clustered hash functions identified by a sum of the hash function offset and the hash function identifier.

10. A method, comprising:
in each node of a set of nodes in an address translation table, storing a key value and a hash function identifier;
for each node in the set of nodes, calculating a hash result for the key value by executing a hash function identified by the hash function identifier; and
in response to a request to translate a virtual memory address to a physical memory address, identifying a physical memory region corresponding to the virtual memory address based on the calculated hash result for each node in the set of nodes.

11. The method of claim 10, further comprising:
for each key value stored in the address translation table, associating the key value with a plurality of hash function identifiers including the hash function identifier.

12. The method of claim 10, further comprising:
in response to the request, traversing the address translation table according to a sequence of the set of nodes by, for each node in the set of nodes, identifying a next node in the sequence based on the hash result calculated for the node.

13. The method of claim 10, further comprising:
in each entry of a set of entries in a leaf node in the set of nodes, associating a slab identifier with the hash function identifier of the leaf node; and
identifying the physical memory region corresponding to the virtual memory address by:
based on a lookup of the slab identifier in a slab table, determining a slab allocation size, a slab size, and a base address of a slab identified by the slab identifier, and
calculating the physical memory address based on the slab allocation size, the slab size, the base address, and the hash result calculated for the leaf node.

14. The method of claim 10, further comprising:
for a parent process associated with the address translation table, creating a child process that is a copy of the parent process by, for each node in the set of nodes,
creating a copy of the hash function identifier in a new address translation table associated with the child process, and
associating the copy with the key value of the node.

15. The method of claim 10, wherein:
for each node of the plurality of nodes, the hash function identified by the hash function identifier is one of a plurality of clustered hash functions executable by a hash engine to calculate a set of sequential hash values based on the key value; and
the method further comprises:
in an allocation bit vector associated with a physical memory region, storing a deasserted bit for each allocated page in the physical memory region, and an asserted bit for each free page in the physical memory region, and
for a leaf node in the set of nodes, calculating the hash function identifier of the leaf node by performing a SELECT function based on the allocation bit vector.

16. The method of claim 10, further comprising:
in an address translation buffer, associating a virtual page number of the virtual memory address with a slab identifier, the key value, the hash function identifier of a leaf node in the set of nodes, and a plurality of hash function offsets, wherein the hash function identifier identifies a base hash function of a set of clustered hash functions; and
calculating a plurality of physical memory addresses by, for each hash function offset of the plurality of hash function offsets, executing one of the set of clustered hash functions identified by a sum of the hash function offset and the hash function identifier.

17. A computing system, comprising:
a memory system configured to store an address translation table, wherein the address translation table is configured to, in each node of a set of nodes in the address translation table, store a key value and a hash function identifier;
a processing unit configured to,
for each node in the set of nodes, calculate a hash result for the key value by executing a hash function identified by the hash function identifier; and
in response to a request to translate a virtual memory address to a physical memory address, identify a physical memory region in the memory system corresponding to the virtual memory address based on the calculated hash result for each node in the set of nodes.

18. The computing system of claim 17, wherein:
the set of nodes comprises a leaf node;
the leaf node comprises a set of entries each associating a slab identifier with the hash function identifier for the leaf node; and
the processing unit is further configured to identify the physical memory region corresponding to the virtual memory address by:
based on a lookup of the slab identifier in a slab table, determine a slab allocation size, a slab size, and a base address of a slab identified by the slab identifier, and
calculate the physical memory address based on the slab allocation size, the slab size, the base address, and the hash result calculated for the leaf node.

19. The computing system of claim 17, wherein the processing unit is further configured to, after identifying the physical memory region in the memory system corresponding to the virtual memory address, retrieve application data from the identified physical memory region.

20. The computing system of claim 17, further comprising:
a plurality of computing devices, wherein the memory system comprises a plurality of memory devices each residing in a different one of the plurality of computing devices;
the processing device resides in one of the plurality of computing devices; and
the physical memory region is located in a different computing device than the processing device.

* * * * *